(12) United States Patent
Hanaki et al.

(10) Patent No.: US 10,358,846 B2
(45) Date of Patent: Jul. 23, 2019

(54) VEHICLE DOOR OPENING AND CLOSING APPARATUS

(71) Applicant: MITSUI KINZOKU ACT CORPORATION, Kanagawa (JP)

(72) Inventors: Naoki Hanaki, Kanagawa (JP); Kohei Yamashita, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 982 days.

(21) Appl. No.: 14/776,444

(22) PCT Filed: Sep. 3, 2014

(86) PCT No.: PCT/JP2014/073210
§ 371 (c)(1),
(2) Date: Sep. 14, 2015

(87) PCT Pub. No.: WO2016/006124
PCT Pub. Date: Jan. 14, 2016

(65) Prior Publication Data
US 2016/0201361 A1   Jul. 14, 2016

(30) Foreign Application Priority Data

Jul. 10, 2014   (JP) ................ 2014-142221

(51) Int. Cl.
*E05B 81/16*   (2014.01)
*E05B 83/40*   (2014.01)
(Continued)

(52) U.S. Cl.
CPC ............ *E05B 81/16* (2013.01); *B60J 5/06* (2013.01); *E05B 81/20* (2013.01); *E05B 83/40* (2013.01);
(Continued)

(58) Field of Classification Search
CPC ............ Y10T 292/08; Y10T 292/0801; Y10T 292/081; Y10T 292/0848; Y10T 292/0849;
(Continued)

(56) References Cited

U.S. PATENT DOCUMENTS 7,472,944 B2 *   1/2009   Miyagawa ............... E05B 81/14
                                                                    296/155
8,333,414 B2 *   12/2012   Takayanagi ............. E05B 81/14
                                                                    292/201
(Continued)

FOREIGN PATENT DOCUMENTS

CN   103362379 A   10/2013
CN   103670065 A   3/2014
(Continued)

OTHER PUBLICATIONS

International Search Report PCT/JP2014/073210 dated Oct. 28, 2014.
(Continued)

*Primary Examiner* — Alyson M Merlino
(74) *Attorney, Agent, or Firm* — McDermott Will & Emery LLP

(57) ABSTRACT

A vehicle door opening and closing apparatus includes: a closing latch mechanism having a first latch and a first ratchet; an opening latch mechanism having a second latch and a second ratchet; a release electric mechanism configured to operate the first ratchet to a released position; an opening latch interlocking mechanism configured to operate in a cancel direction from an initial position in association with movement of the second latch from the unlatched position to the latched position; a relay mechanism configured to enable returning of the first ratchet stopped at the released position by switching over from a connected state to a disconnected state; and a cable that is routed through (Continued)

inside of a door trim and that transmits the operation of the opening latch interlocking mechanism in the cancel direction to the relay mechanism.

4 Claims, 17 Drawing Sheets

(51) Int. Cl.
    *B60J 5/06*     (2006.01)
    *E05B 85/24*     (2014.01)
    *E05B 81/20*     (2014.01)
    *E05B 79/20*     (2014.01)
    *E05B 81/06*     (2014.01)

(52) U.S. Cl.
    CPC ............ *E05B 85/243* (2013.01); *E05B 79/20* (2013.01); *E05B 81/06* (2013.01)

(58) Field of Classification Search
    CPC ......... Y10T 292/0851; Y10T 292/0852; Y10T 292/0853; Y10T 292/0854; Y10T 292/0855; Y10T 292/0857; Y10T 292/0859; Y10T 292/1044; Y10T 292/1047; Y10T 292/1082; Y10T 292/1078; Y10T 292/1055; Y10T 292/1057; Y10T 292/1059; Y10T 292/1076; Y10T 292/108; E05B 81/12; E05B 81/14; E05B 81/16; E05B 81/20; E05B 81/06; E05B 83/40; E05B 85/243; E05B 79/20; B60J 5/06
    USPC ....................................................... 296/155
    See application file for complete search history.

(56) References Cited

U.S. PATENT DOCUMENTS

| | | | | |
|---|---|---|---|---|
| 9,650,816 B2* | 5/2017 | Okuma | .................... | E05B 81/20 |
| 9,670,703 B2* | 6/2017 | Hanaki | .................... | E05B 83/40 |
| 10,214,944 B2* | 2/2019 | Hanaki | .................... | E05B 81/14 |
| 2002/0060461 A1* | 5/2002 | Choi | ....................... | E05B 83/40 |
| | | | | 292/336.3 |
| 2005/0099017 A1* | 5/2005 | Yoneyama | ............... | E05B 81/20 |
| | | | | 292/216 |
| 2005/0099022 A1* | 5/2005 | Wakatsuki | ............... | E05B 81/20 |
| | | | | 292/336.3 |
| 2006/0125244 A1* | 6/2006 | Mochizuki | ............... | E05B 81/06 |
| | | | | 292/201 |
| 2008/0105011 A1* | 5/2008 | Machida | .................. | E05B 81/20 |
| | | | | 70/237 |
| 2010/0026014 A1* | 2/2010 | Machida | .................. | E05B 81/20 |
| | | | | 292/216 |
| 2012/0056437 A1 | 3/2012 | Takayanagi et al. | | |
| 2012/0139269 A1 | 6/2012 | Kouzuma | | |
| 2013/0249222 A1 | 9/2013 | Yokomori et al. | | |
| 2014/0000169 A1* | 1/2014 | Yokomori | ............... | E05B 81/20 |
| | | | | 49/349 |
| 2014/0062101 A1 | 3/2014 | Yokomori et al. | | |
| 2014/0070549 A1 | 3/2014 | Hanaki et al. | | |

FOREIGN PATENT DOCUMENTS

| | | |
|---|---|---|
| CN | 203476012 U | 3/2014 |
| CN | 203476612 U | 3/2014 |
| FR | 2919328 A1 | 1/2009 |
| JP | 2005-213818 A | 8/2005 |
| JP | 2009-030363 A | 2/2009 |
| JP | 4428047 B2 | 3/2010 |
| JP | 2012-072645 A | 4/2012 |
| JP | 2014-047548 A | 3/2014 |
| JP | 2014-074324 A | 4/2014 |
| WO | 2012/017715 A1 | 2/2012 |

OTHER PUBLICATIONS

Office Action issued in corresponding Chinese Patent Application No. 201480023601.2, dated Nov. 28, 2016.

* cited by examiner

FIG.8 (RELEASE RESTRAINED STATE CANCELED)

(IN UNLATCH OPERATION)

(RELEASE OPERATED STATE)

VEHICLE DOOR OPENING AND CLOSING APPARATUS

CROSS-REFERENCE TO RELATED APPLICATIONS

This Application is the U.S. National Phase of PCT/JP2014/073210 filed Sep. 3, 2014, which claims priority to Japanese Patent Application No. 2014-142221 filed Jul. 10, 2014. The subject matter of each is incorporated herein by reference in entirety.

FIELD

The present invention relates to a vehicle door opening and closing apparatus, which is able to cause, by a release electric mechanism, a closing latch mechanism that locks a door of a vehicle to perform release operation.

BACKGROUND

Conventionally, a vehicle door opening and closing apparatus has been used, which includes: a latch mechanism (closing latch mechanism) including a latch that is able to retain a door in a closed state by engaging with a striker and a ratchet that is able to engage with this latch; and a release electric mechanism mechanically coupled to the ratchet and including a drive source, such as a motor.

In this a configuration, if an electric trouble, such as motor failure or sticking, occurs when release operation for releasing the engagement in the closing latch mechanism is being performed by the release electric mechanism, the ratchet may be restrained in a release operated state (hereinafter, this state being referred to as "release restrained state"). After being brought into this release restrained state, the ratchet is unable to engage with the latch and the door becomes unable to be retained in a closed position.

In order to deal with such failure, a configuration has been proposed, which is, if a release restrained state is caused, able to cancel the release restrained state by inserting a tool from an operation hole open to inside of a vehicle or manually operating a knob provided inside the vehicle (for example, see Patent Literature 1 and Patent Literature 2).

CITATION LIST

Patent Literature

Patent Literature 1: Japanese Patent No. 4428047
Patent Literature 2: Japanese Patent Application Publication No. 2005-213818

SUMMARY

Technical Problem

The above described conventional technique requires the special manual operation for canceling the release restrained state. Thus, a user needs to know beforehand the method of canceling the release restrained state and if the user does not know the method, a countermeasure, such as referring to a vehicle manual, becomes necessary and the door is unable to be closed quickly. A mechanism, which is able to cancel the release restrained state without forcing a special operation on a user, is therefore useful, but it is a problem to install this mechanism in a smoothly operable state inside a vehicle with limited space.

The present invention has been made in view of the above described problems of the conventional technique and aims to provide a vehicle door opening and closing apparatus, which is able to smoothly operate a mechanism for canceling a release restrained state.

Solution to Problem

A vehicle door opening and closing apparatus according to the present invention includes: a closing latch mechanism that is provided in a door and has: a first latch configured to be movable to a latched position from an unlatched position; and a first ratchet configured to retain the door in a closed position by engaging with the first latch that is in the latched position; an opening latch mechanism that is provided in the door and has: a second latch configured to be movable to a latched position from an unlatched position; and a second ratchet configured to hold the door in a closed position by engaging with the second latch that is in the latched position; a release electric mechanism configured to operate the first ratchet to a released position; an opening latch interlocking mechanism configured to operate in a cancel direction from an initial position in association with movement of the second latch from the unlatched position to the latched position and provided, together with the opening latch mechanism, in the door; a relay mechanism configured to enable returning of the first ratchet stopped at the released position by switching over from a connected state to a disconnected state, the connected state connecting a release operation transmission path enabling transmission of release operation of the release electric mechanism to the first ratchet and the disconnected state disconnecting the release operation transmission path, and switch over from the connected state to the disconnected state by the operation of the opening latch interlocking mechanism in the cancel direction; and a cable that is routed through inside of a door trim provided in the door and that transmits the operation of the opening latch interlocking mechanism in the cancel direction to the relay mechanism.

According to this configuration, by a normal operation of just opening the door, the release restrained state is able to be canceled. Therefore, even if the release restrained state is caused, the door is able to be retained in the closed position without a special operation being forced on a user. What is more, the cable that transmits the operation of the opening latch interlocking mechanism in the cancel direction for canceling the release restrained state to the relay mechanism is routed through the inside of the door trim. Thereby, the opening latch interlocking mechanism and the relay mechanism are able to be coupled to each other in a state where operation force is transmittable therebetween, and the mechanism for canceling the release restrained state is able to be smoothly operated.

The opening latch interlocking mechanism is attached, together with the opening latch mechanism, to a lower surface of a lower arm that supports the door with respect to a door opening of a vehicle. The cable is routed into the door trim from the lower surface of the lower arm. By attaching the opening latch interlocking mechanism, together with the opening latch mechanism, to the lower surface of the lower arm, without getting in the way of installation space of various elements, such as the relay mechanism, installed in the door, for example, the opening latch interlocking mechanism is able to be installed. Moreover, by routing the cable coupling the opening latch interlocking mechanism and the relay mechanism into the door trim from the lower surface of the lower arm, this cable is prevented from being exposed externally.

The lower arm includes a plate, and a flange that protrudes downward from a side edge portion of the plate. The opening latch mechanism and the opening latch interlocking mechanism are attached to the lower surface of the plate at a position that is at an inner side of the flange. Thereby, the opening latch mechanism and the opening latch interlocking mechanism are able to be hidden inside the flange and these mechanisms are prevented from being stepped on upon getting on/off, and the like.

The opening latch interlocking mechanism includes a cancel lever configured to rotationally move along with rotation of the second latch from the unlatched position to the latched position. The relay mechanism includes a disconnecting lever configured to switch the relay mechanism from the connected state to the disconnected state by being connected to the cancel lever via the cable.

Advantageous Effects of Invention

According to the present invention, the opening latch interlocking mechanism and the relay mechanism are able to be coupled to each other in a state where operation force is transmittable therebetween, and the mechanism for canceling the release restrained state is able to be operated smoothly.

DESCRIPTION OF EMBODIMENTS

Hereinafter, preferred embodiments of a vehicle door opening and closing apparatus according to the present invention will be described in detail with reference to the appended drawings.

Figure 1:
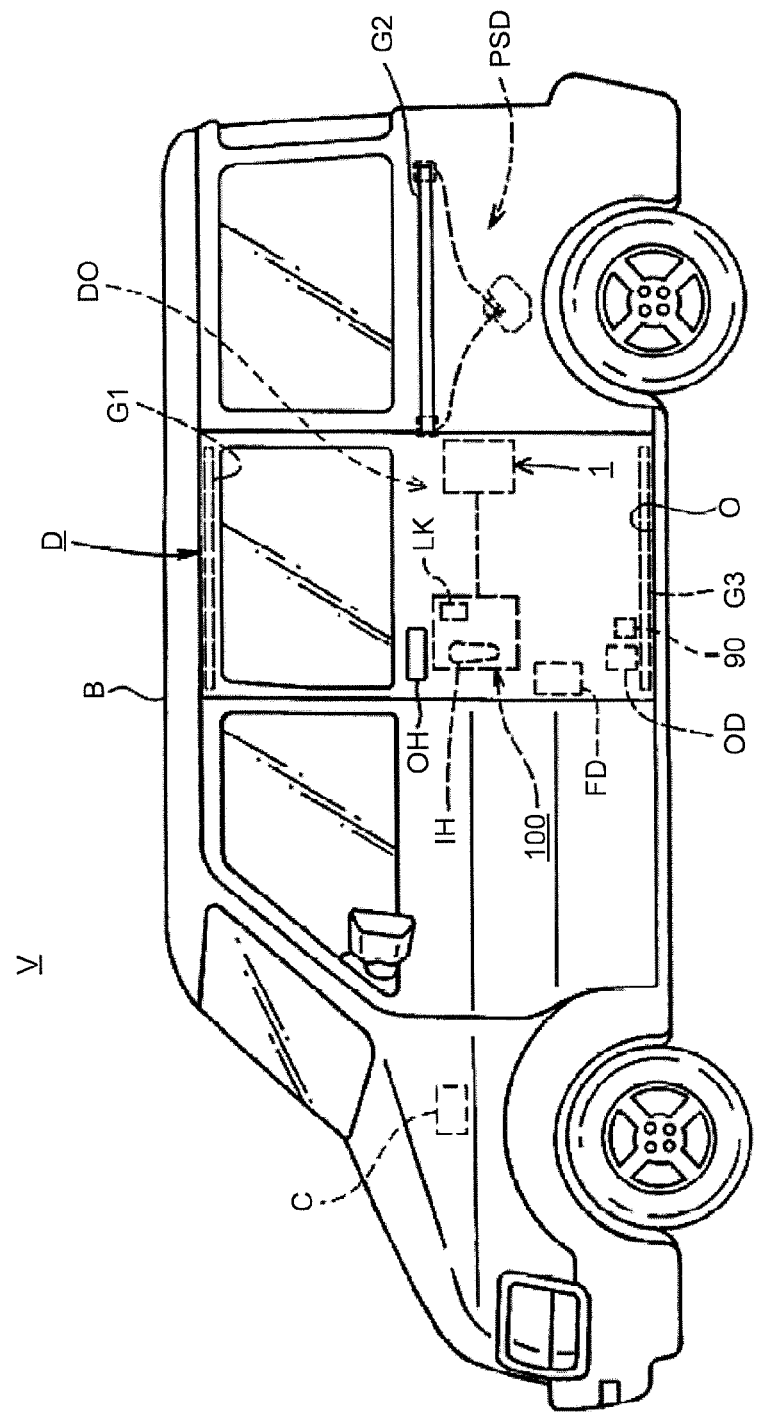
FIG. 1 is a side view of a vehicle including a vehicle door opening and closing apparatus according to an embodiment of the present invention.

1. Description of Overall Configuration of Vehicle Door Opening and Closing Apparatus FIG. 1 is a side view of a vehicle V including a vehicle door opening and closing apparatus DO according to an embodiment of the present invention. As illustrated in FIG. 1, the vehicle V includes a door D that opens and closes a door opening O, which is open on a side surface of a body B. The door D is a slide door, which is able to open and close in a front-rear direction, by being supported by an upper guide rail G1, a waist guide rail G2, and a lower guide rail G3, which are fixed to the body B and are in the front-rear direction. Inside the side surface of the body B, an electric opening and closing device PSD, which is for electrically causing opening and closing movement of the door D, is provided.

On an outer surface of the door D, an outside handle OH is provided, which is operated when the door D is opened or closed from outside the vehicle. On an inner surface of the door D, an inside handle IH, which is operated when the door D is opened or closed from inside the vehicle, and a lock operation knob LK, which is operated when an operation relay device 100 is switched over between an unlocked state and a locked state with manual operation, are provided. At a front portion of the door D, a front door latch device FD is provided, which is for retaining the door in a closed position. At a lower portion of the door D, a fully opening latch device OD for retaining the door D in a fully opened position, and an opening latch interlocking mechanism 90, which is able to output release cancel operation for canceling a later described release restrained state, are provided. At a rear portion of the door, a rear door latch device 1 is provided, which is for, together with the front door latch device FD, holding the door D at the closed position.

The operation relay device 100 is provided inside the door D. The operation relay device 100 performs relay control of manual operation of the outside handle OH and inside handle IH and electric operation by release driving of a motor 32 (see FIG. 2). The operation relay device 100 transmits the relay controlled operation to each of the rear door latch device 1, front door latch device FD, and fully opening latch device OD.

2. Description of Rear Door Latch Device

Figure 2:
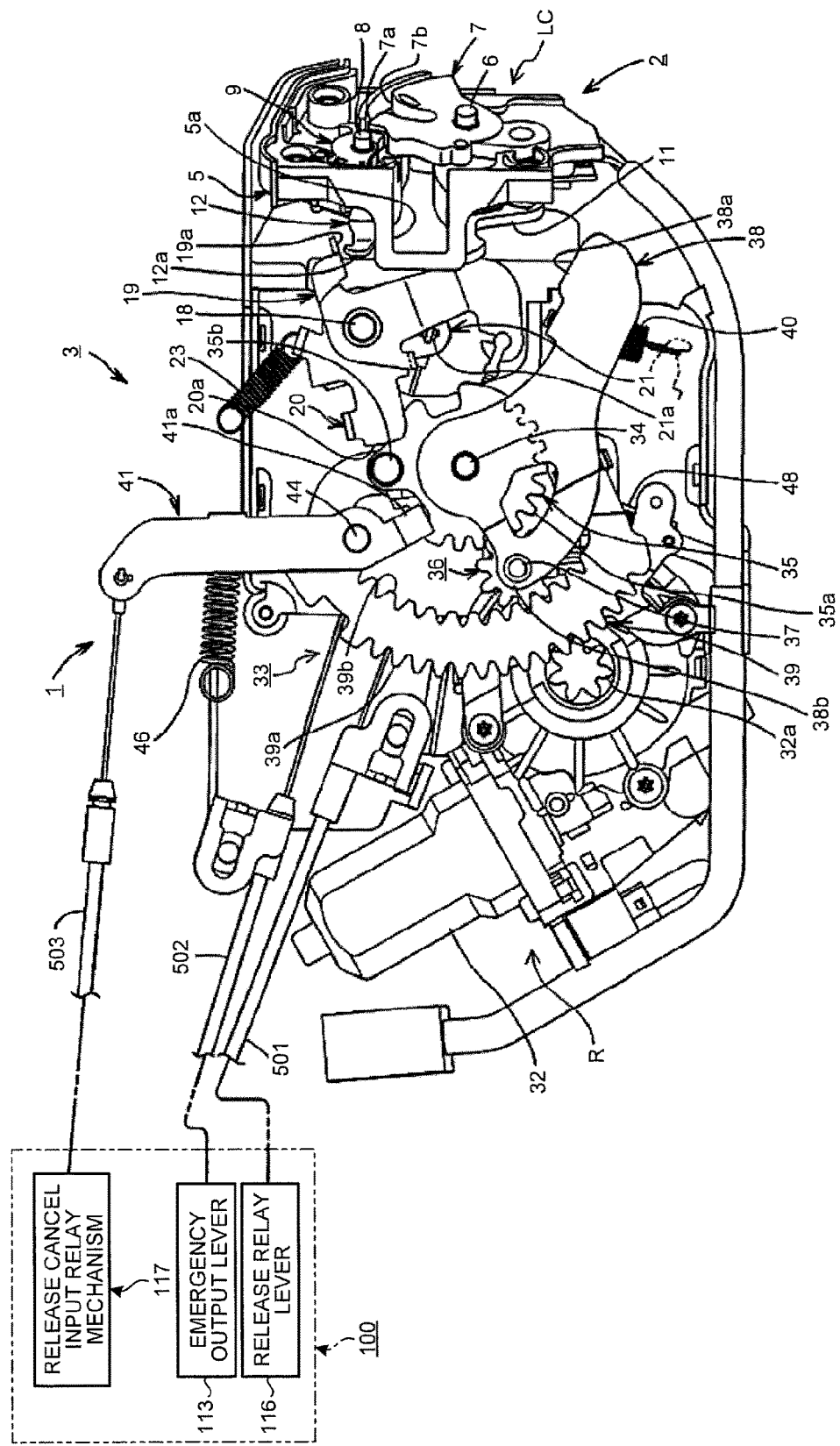
FIG. 2 is a side view of a rear door latch device as viewed from inside of the vehicle.

FIG. 2 is a side view of the rear door latch device 1 as viewed from inside the vehicle. As illustrated in FIG. 2, the rear door latch device 1 includes a latch unit 2 and a closer and release unit 3. The latch unit 2 is a mechanism, which engages with a striker S1 (see FIG. 4) provided on a body B side, and which is for holding the door D in the closed position. The closer and release unit 3 has a closing function and a releasing function for the door D.

2.1 Description of Latch Unit

Figure 3:
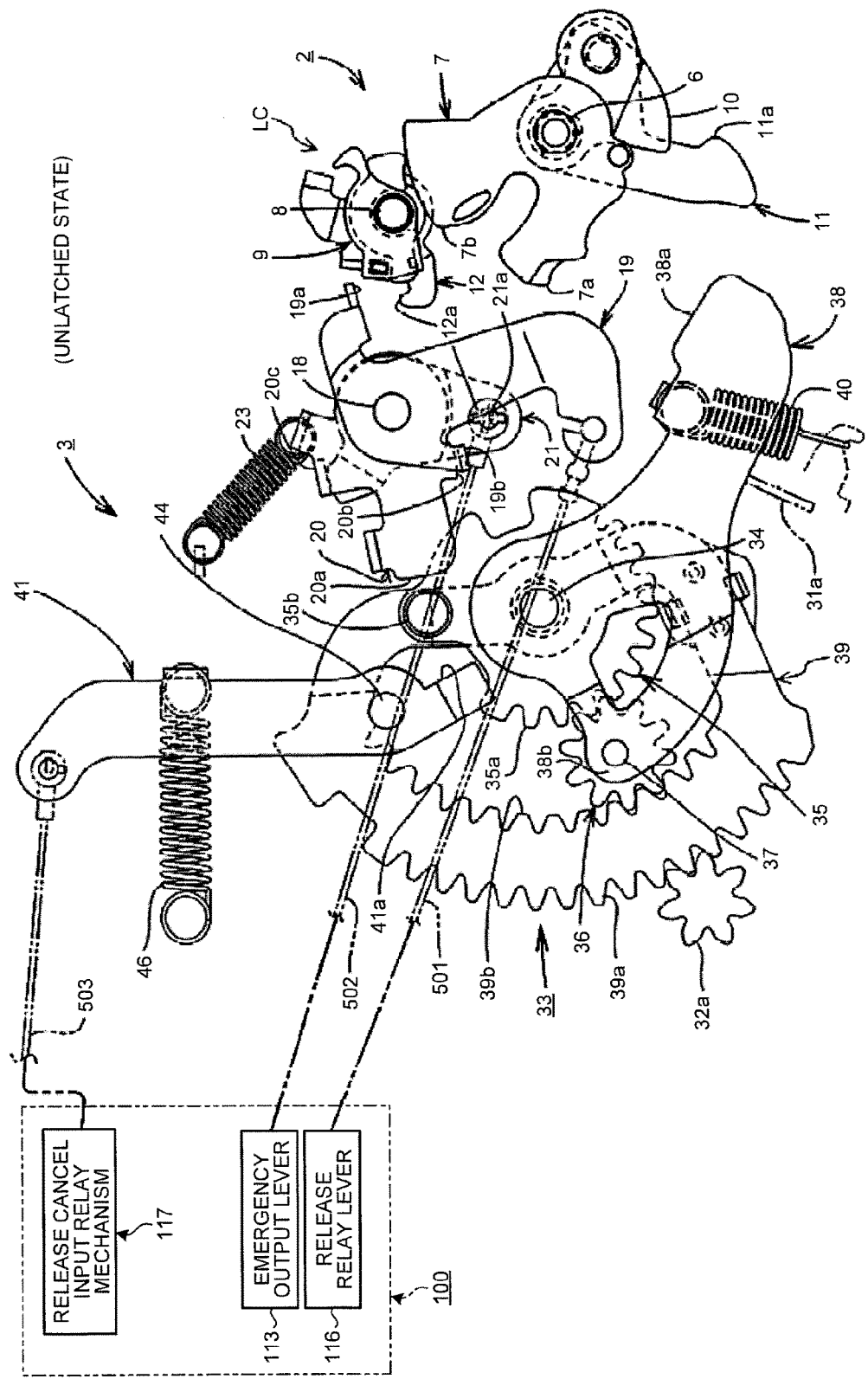
FIG. 3 is a diagram illustrating an unlatched state of the rear door latch device.

As illustrated in FIG. 2 and FIG. 3, the latch unit 2 accommodates, inside a housing 5 attached to the door D, a closing latch mechanism LC, which includes a latch (first latch) 7 and a ratchet (first ratchet) 9. The latch 7 is pivotally supported by a latch shaft 6 directed in the front-rear direction and is able to engage with the striker S1 when the door D is closed. The ratchet 9 is pivotally supported by a ratchet shaft 8 directed in the front-rear direction and is able to selectively engage with a full latch engagement portion 7a or half latch engagement portion 7b, which is provided on an outer periphery of the latch 7. An opening of the housing 5 accommodating the closing latch mechanism LC is closed by a cover plate, which is not illustrated in the figures. The latch unit 2 is attached to the door D via this cover plate.

As the latch 7 rotationally moves by a predetermined angle in a closing direction (clockwise direction in FIG. 5) against urging force of a spring (not illustrated in the figures), into which the latch shaft 6 is inserted, the latch 7 is brought into, from an unlatched position (see FIG. 3) off the striker S1, to a half latched position (see FIG. 4) where the latch slightly engages with the striker S1. As the latch 7 rotationally moves in the closing direction further, the latch 7 is brought into a fully latched position (see FIG. 6) where the latch 7 engages completely with the striker S1. The fully latched position of the latch 7 corresponds to a fully closed position of the door D.

At a front face side of the housing 5: a detection lever 10 and a latch lever 11, which are pivotally supported by the latch shaft 6 and are able to rotationally move integrally with the latch 7; and an open lever 12, which is pivotally supported by the ratchet shaft 8 and is able to rotationally move integrally with the ratchet 9, are arranged (see FIG. 3).

Figure 4:
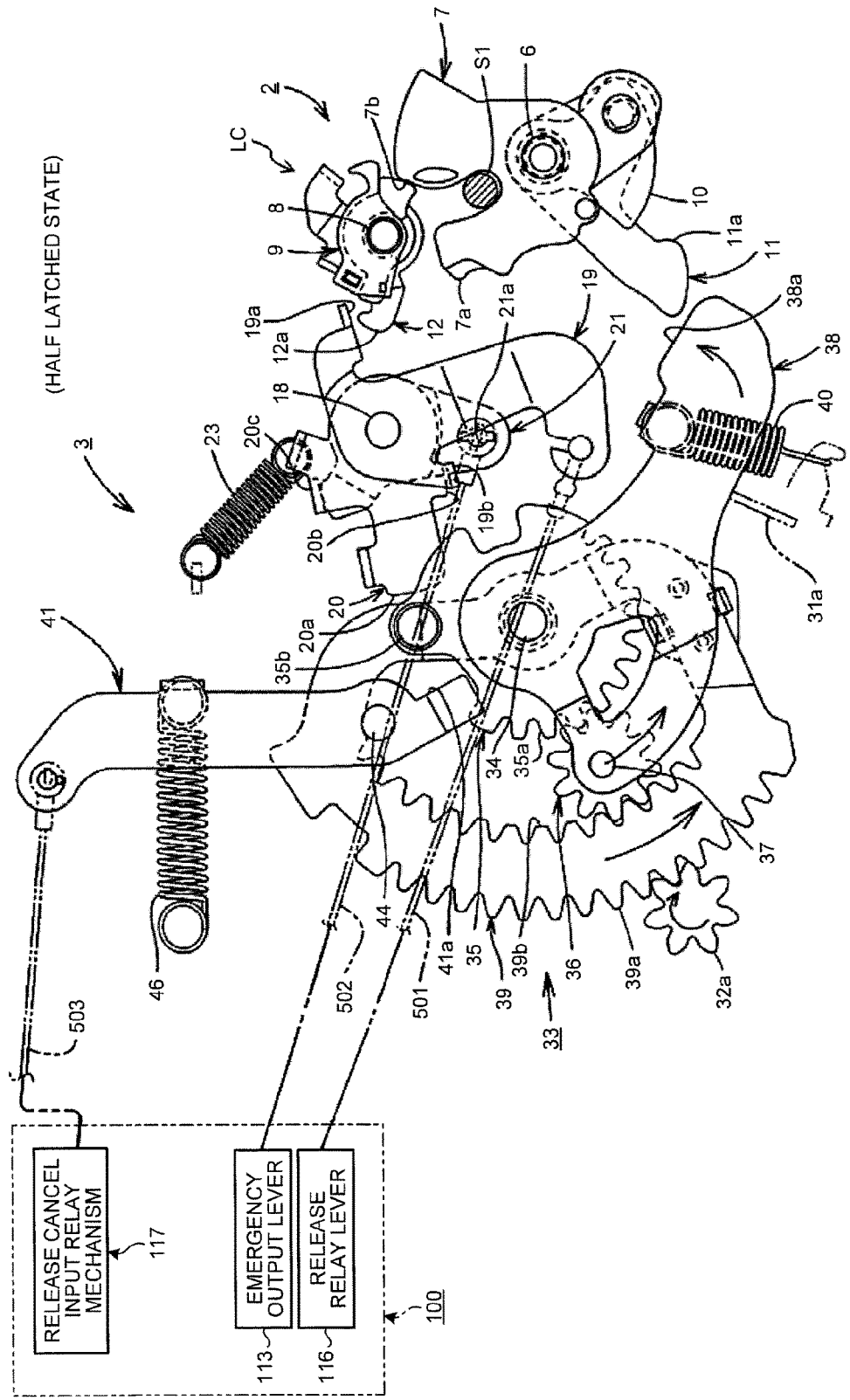
FIG. 4 is a diagram illustrating a half latched state of the rear door latch device.
Figure 5:
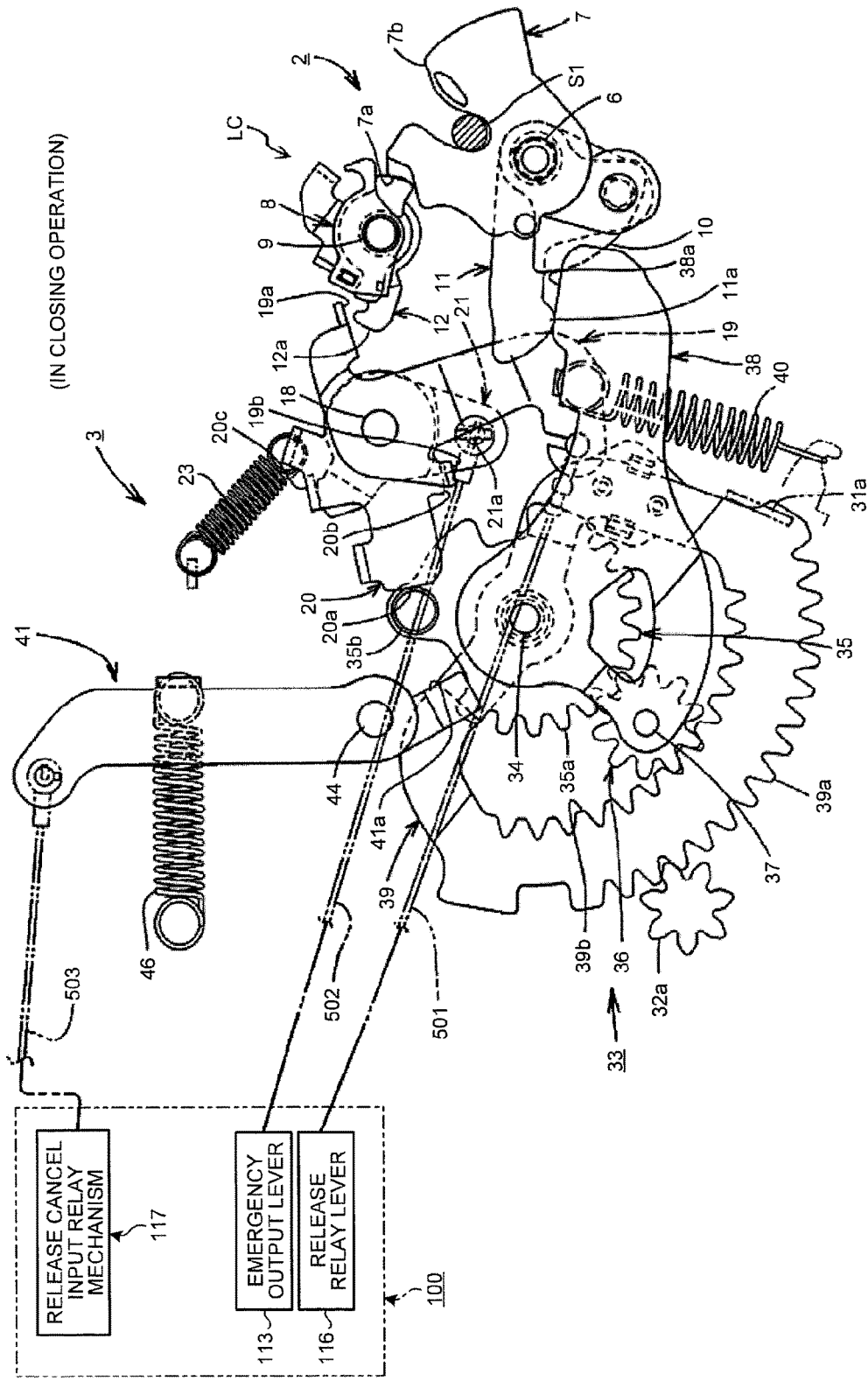
FIG. 5 is a diagram illustrating a state during closing operation of the rear door latch device.

The latch lever 11 rotationally moves integrally with the latch 7. When the latch 7 is at the unlatched position as illustrated in FIG. 3, an operating portion 11a provided at a distal end portion of the latch lever 11 retracts outside a movement track of a closing portion 38a of a close lever 38. When the latch 7 rotationally moves to the half latched position as illustrated in FIG. 4, the operating portion 11a of the latch lever 11 enters the movement track of the closing portion 38a.

The half latched position and fully latched position of the latch 7 are detected by a half latch detection switch and a full latch detection switch, which are not illustrated in the figures. These detection signals are transmitted to a control unit (ECU) C (see FIG. 1) installed in the vehicle V and trigger stop control and drive control of the motor 32 of the closer and release unit 3 and electric opening and closing device PSD.

The ratchet 9 is urged to an engagement direction (clockwise direction in FIG. 4, for example) at all times, integrally with the open lever 12, by urging force of a spring, which is not illustrated in the figures. The ratchet 9 abuts against the outer periphery of the latch 7, when the latch 7 is at the unlatched position illustrated in FIG. 3. When the latch 7 is at the half latched position illustrated in FIG. 4, the ratchet 9 is retained in an engaged position where the ratchet 9 is engaged with the half latch engagement portion 7b of the latch 7, and when the latch 7 is at the fully latched position illustrated in FIG. 6, the ratchet 9 is retained in an engaged position where the ratchet 9 is engaged with the full latch engagement portion 7a of the latch 7.

Figure 6:
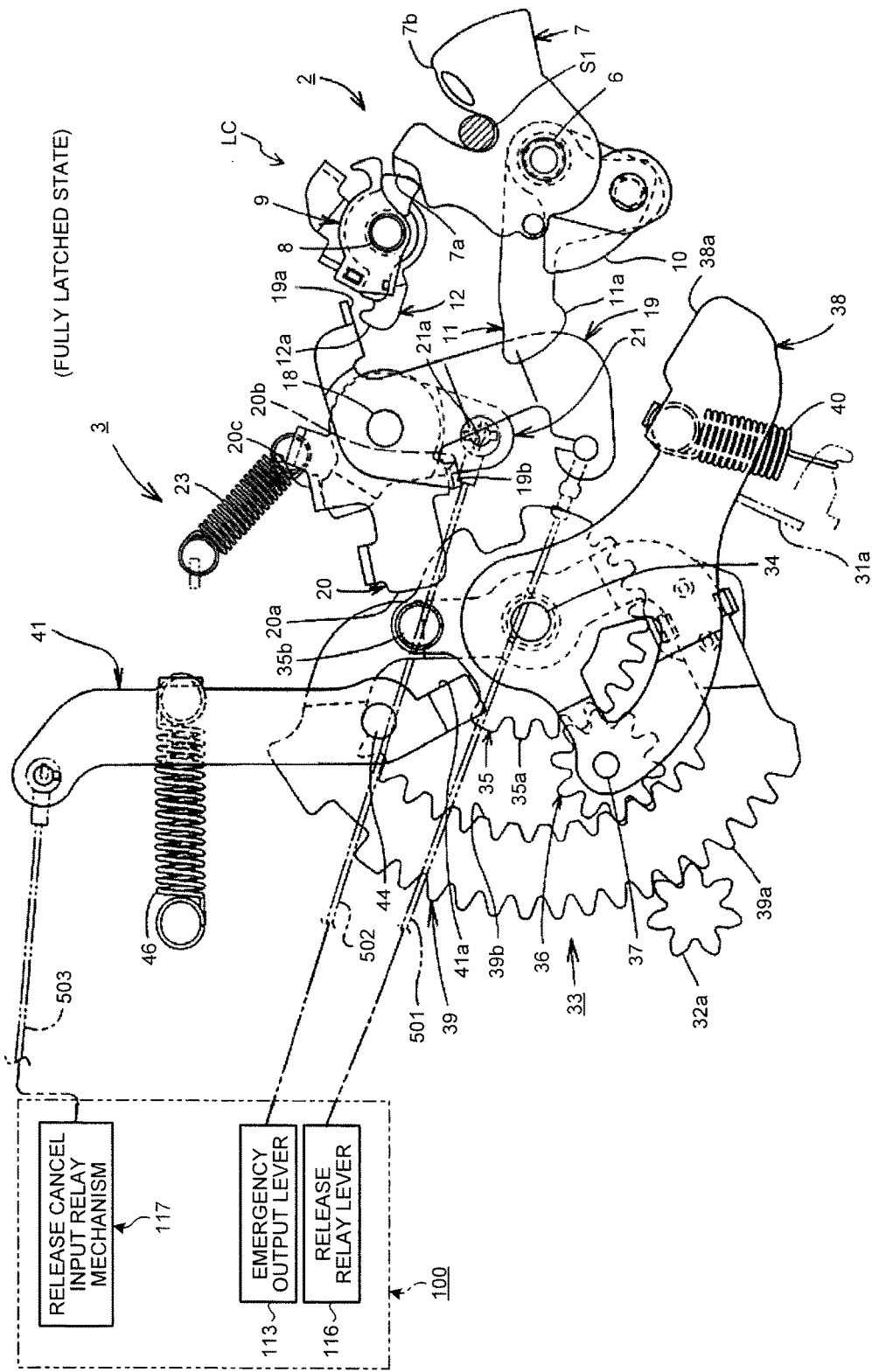
FIG. 6 is a diagram illustrating a fully latched state of the rear door latch device.
Figure 7:
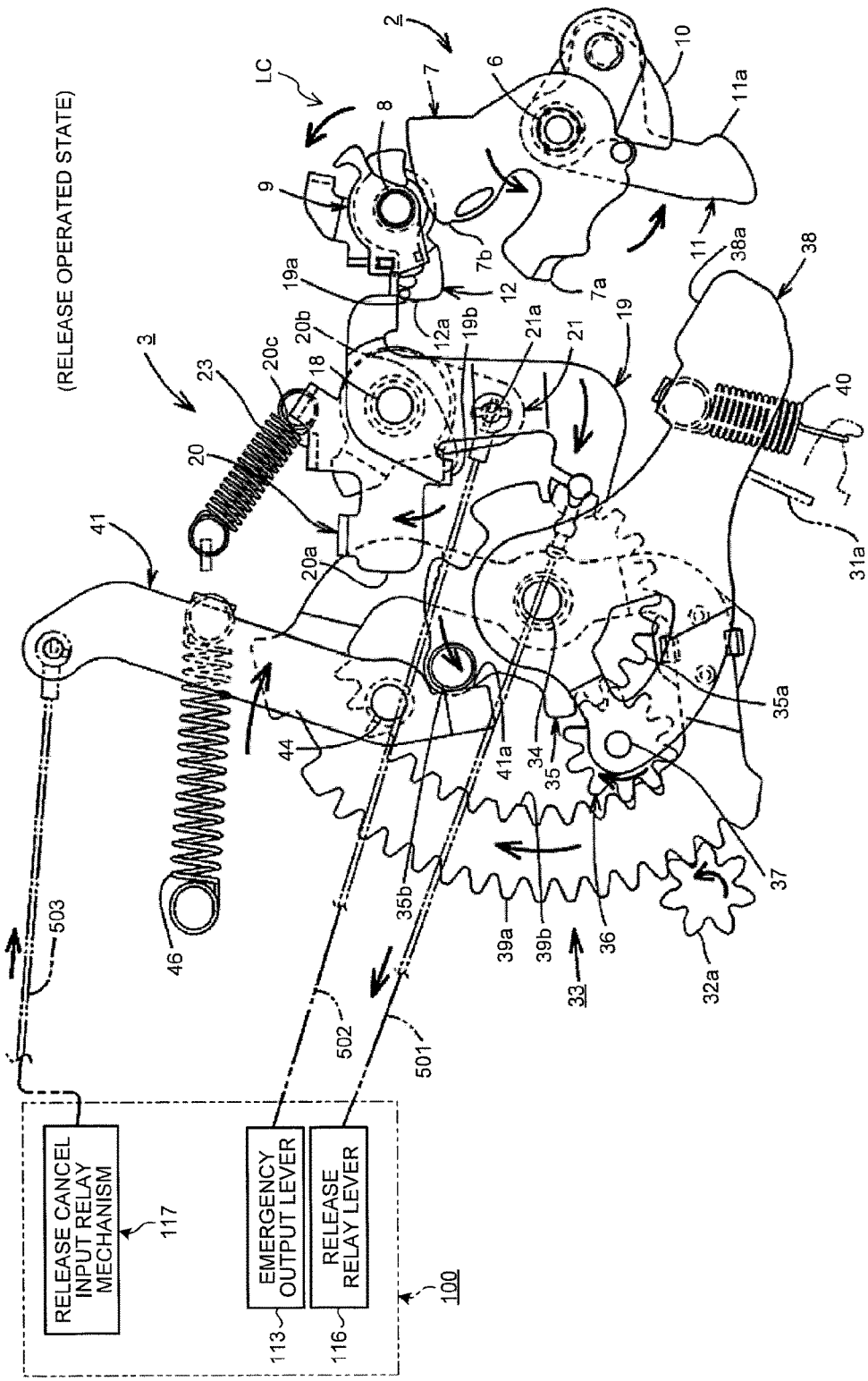
FIG. 7 is a diagram illustrating a release operated state of the rear door latch device.

If door opening operation is performed on the outside handle OH or the inside handle IH when the ratchet 9 is at the engaged position where the ratchet 9 is engaged with the full latch engagement portion 7a of the latch 7, the ratchet 9 rotationally moves in a release direction (anticlockwise direction in FIG. 4 and FIG. 6) via various elements to a released position illustrated in FIG. 7. Thereby, since the ratchet 9 comes off from the full latch engagement portion 7a of the latch 7 and the latch 7 rotationally moves in an opening direction, opening of the door D becomes possible.

As illustrated in FIG. 2 and FIG. 3, on the cover plate of the latch unit 2, each of a release input lever 19, a block lever 20, and an emergency input lever 21 is pivotally supported by a support shaft 18 directed in a vehicle's inside-outside direction.

The release input lever 19 is coupled to a release relay lever 116 of the operation relay device 100 via a cable 501 routed in the door D. The cable 501 is a Bowden cable that is able to transmit operation force, for example, and the same applies to later described cables 502, 503, 504, 506, and 507. When door opening operation is performed on the outside handle OH or the inside handle IH or when the release electric mechanism R including the motor 32 performs release operation, the release input lever 19 rotationally moves in a release direction (clockwise direction in FIG. 4 and FIG. 6) against urging force of a spring 23 from a standby position via respective elements including the release relay lever 116. Thereby, since an arm portion 12a of the open lever 12 is pushed down by a canceling portion 19a and the ratchet 9 moves to the released position, opening of the door D becomes possible as described above.

The block lever 20 is retained in a block position illustrated in FIG. 3 to FIG. 6 by the urging force of the spring 23. When the release input lever 19 moves to the released position (a position illustrated in FIG. 7), a bent portion 19b abuts against a bent portion 20b of a lower portion of the block lever 20 from below and the block lever 20 rotationally moves to a cancel position illustrated in FIG. 7, where the block lever 20 has rotationally moved by a predetermined angle in the anticlockwise direction from the block position.

A coupling portion 21a provided at a lower portion of the emergency input lever 21 is coupled to an emergency output lever 113 of the operation relay device 100 via the cable 502 routed in the door D. The emergency input lever 21 is able to move the block lever 20 to the cancel position and interrupt closing operation of the closer and release unit 3, by door opening operation being performed on either of the outside handle OH or the inside handle IH.

2.2 Description of Closer and Release Unit

As illustrated in FIG. 2 and FIG. 3, the closer and release unit 3 includes the motor 32 for closing and releasing, a planetary gear mechanism 33 that serves as a reduction mechanism, and a release output lever 41. Motive power of the motor 32 is reduced by being transmitted to the planetary gear mechanism 33 via an output gear 32a and operates the release output lever 41. The motor 32, the planetary gear mechanism 33, and the release output lever 41 form the release electric mechanism R that performs release operation on the ratchet 9.

The release output lever 41 is pivotally supported by a shaft 44, is urged at all times in the anticlockwise direction in FIG. 2 and FIG. 3 by a spring 46, and is retained in a standby position illustrated in FIG. 3 to FIG. 6. When a sun gear 35 rotationally moves in a release direction (anticlockwise direction in FIG. 3 to FIG. 6) by release driving of the motor 32, in association therewith, the release output lever 41 performs rotational movement by a predetermined angle in a release direction (clockwise direction in FIG. 3 to FIG. 6) from the standby position (hereinafter, referred to as "release operation").

A top end portion of the release output lever 41 is coupled to a relay lever 118 (see FIG. 15) of a release cancel input relay mechanism 117 (hereinafter, also referred to as "relay mechanism 117") of the operation relay device 100 via the cable 503.

The planetary gear mechanism 33 includes the sun gear 35, a planetary gear 36, the close lever 38, and a sector gear 39. The sun gear 35 is pivotally supported by a support shaft 34. The sun gear 35 has, on an outer side of the circumference of a sector thereof, an outer teeth gear 35*a* that engages with the planetary gear 36, and has, on a rotating surface at an upper portion thereof where the outer teeth gear 35*a* is not formed, an abutting portion 35*b*, which protrudes to inside of the vehicle and which is column shaped. The planetary gear 36 is engaged with the sun gear 35 so as to be rotatable on its own axis and revolvable therearound. The close lever 38 is pivotally supported by the support shaft 34. The close lever 38 pivotally supports the planetary gear 36 by a shaft 37. The sector gear 39 is pivotally supported by the support shaft 34. The sector gear 39 has, on an outer side of the circumference thereof, an outer teeth gear 39*a* that engages with the output gear 32*a*, and has, on an inner side of the circumference, an inner teeth gear 39*b* that engages with the planetary gear 36.

In the half latched state illustrated in FIG. 4, when the sun gear 35 rotationally moves a little in the clockwise direction from a neutral position, the abutting portion 35*b* abuts against a block portion 20*a* and rotational movement of the sun gear 35 in the clockwise direction is interrupted, and closure driving of the motor 32 becomes transmittable to the latch 7. Further, when the block lever 20 moves to the cancel position (position illustrated in FIG. 7) while the motor 32 is closure driving, the block portion 20*a* retracts outside a movement track of the abutting portion 35*b* and closure driving by the motor 32 becomes untransmittable to the latch 7, and thus the closing operation is canceled.

When the planetary gear mechanism 33 is in a neutral state (for example, the state illustrated in FIG. 5), the close lever 38 is urged in the clockwise direction by a spring 40 and retained in a standby position where the close lever 38 abuts against a stopper portion 31*a* (see FIG. 3) from above. In this state, the sector gear 39 is set at a neutral position where the outer teeth gear 39*a* is directed forward. This neutral position of the sector gear 39 is detected by a detection switch 48 arranged below the sector gear 39 and transmitted to the control unit C.

2.3 Description of Closing Operation of Closer and Release Unit

When the door D in a released state moves to a half-opened position by motive power of the electric opening and closing device PSD, and the striker S1 enters a striker entrance groove 5*a* of the housing 5 and engages with the latch 7, the closing latch mechanism LC changes from the unlatched state illustrated in FIG. 3 to the half latched state illustrated in FIG. 4. When the half latched position of the latch 7 is detected by the half latch detection switch, the motor 32 is closure controlled (forward rotation control) by the control unit C. Thereby, the motor 32 performs closure driving and the output gear 32*a* rotationally moves in a direction of an arrow illustrated in FIG. 4 (clockwise direction). When this happens, rotational movement of the sun gear 35 in the clockwise direction is interrupted by the block portion 20*a* of the block lever 20 which is at the block position. Accordingly, the sector gear 39 rotationally moves about the support shaft 34 in a closing direction of a direction of an arrow illustrated in FIG. 4 (anticlockwise direction), and along with the revolution of the planetary gear 36, the close lever 38 rotationally moves in a closing direction (anticlockwise direction) of a direction of an arrow illustrated in FIG. 4 against urging force of the spring 40. Thereby, the closing portion 38*a* moves upward and pushes up the operating portion 11*a* of the latch lever 11 and rotationally moves the latch 7 to the fully latched position illustrated in FIG. 5. When the fully latched position of the latch 7 is detected by the full latch detection switch, the motor 32 is once stop controlled by the control unit C and thereafter is subjected to reverse rotation control.

When the motor 32 is subjected to the reverse rotation control, the close lever 38 rotates reversely by receiving rotary motive power by revolution of the planetary gear 36 and the urging force of the spring 40, and returns to the standby position as illustrated in FIG. 6. When the neutral position of the sector gear 39 is then detected by the detection switch 48, the control unit C performs stop control of the motor 32. Therefore, the planetary gear mechanism 33 returns to the pre-operation neutral state and a series of processes of the closing operation are completed.

2.4 Description of Release Operation of Closer and Release Unit

If the motor 32 performs release driving, based on operation on an operating switch provided in the vehicle V or portable wireless operating switch when the closing latch mechanism LC is in the half latched state or fully latched state illustrated in FIG. 4 or FIG. 6, the sector gear 39 rotationally moves in a release direction (clockwise direction) about the support shaft 34 and the planetary gear 36 rotates on its own axis in the clockwise direction without revolving. As a result, the sun gear 35 rotationally moves by a predetermined angle in the release direction (anticlockwise direction), and the abutting portion 35*b* presses a release portion 41*a* of the release output lever 41 and causes the release output lever 41 to rotationally move in the clockwise direction and to perform release operation (see FIG. 7).

The release operation of the release electric mechanism R is transmitted to the ratchet 9 via various elements of the operation relay device 100 and the like and rotationally moves the ratchet 9 from the engaged position to the released position. Thereby, opening of the door D becomes possible. After the release operation ends, the motor 32 is subjected to reverse rotation control, and the release output lever 41 and the various elements moved in association with the release operation of the release output lever 41 return to their standby position.

Figure 9:
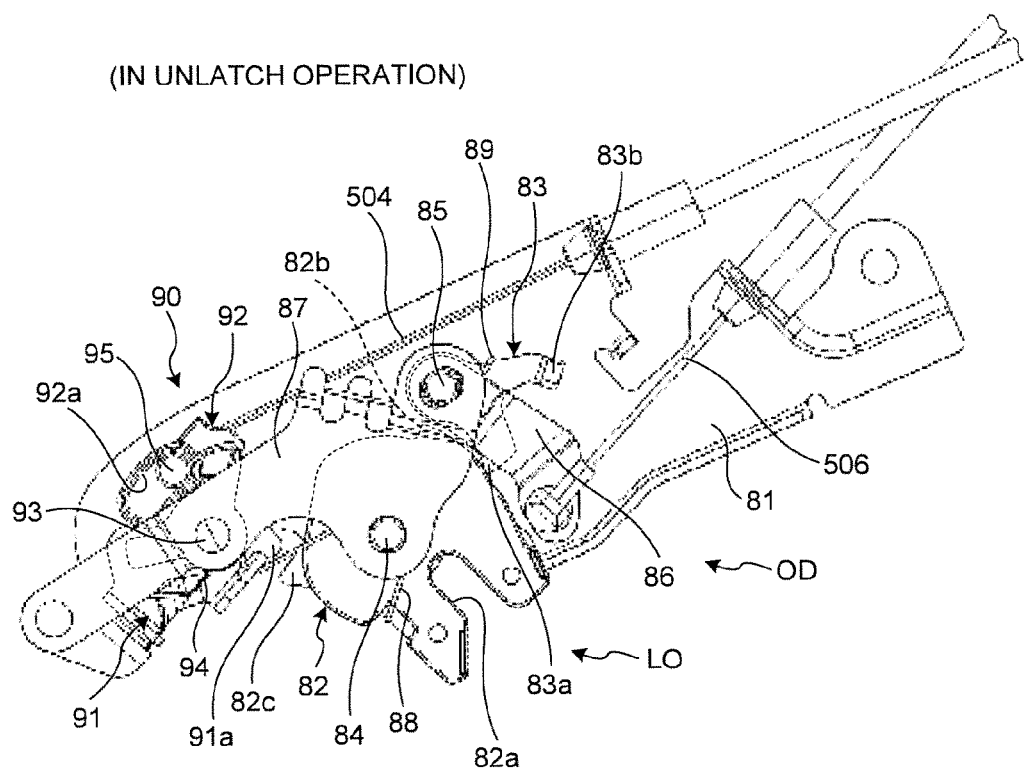
FIG. 9 is a plan view of a fully opening latch device and an opening latch interlocking mechanism.

3. Description of Fully Opening Latch Device and Opening Latch Interlocking Mechanism FIG. 9 is a plan view of the fully opening latch device CD and the opening latch interlocking mechanism 90, and illustrates a state where the door D is at the fully closed position.

3.1 Description of Fully Opening Latch Device

Figure 13:
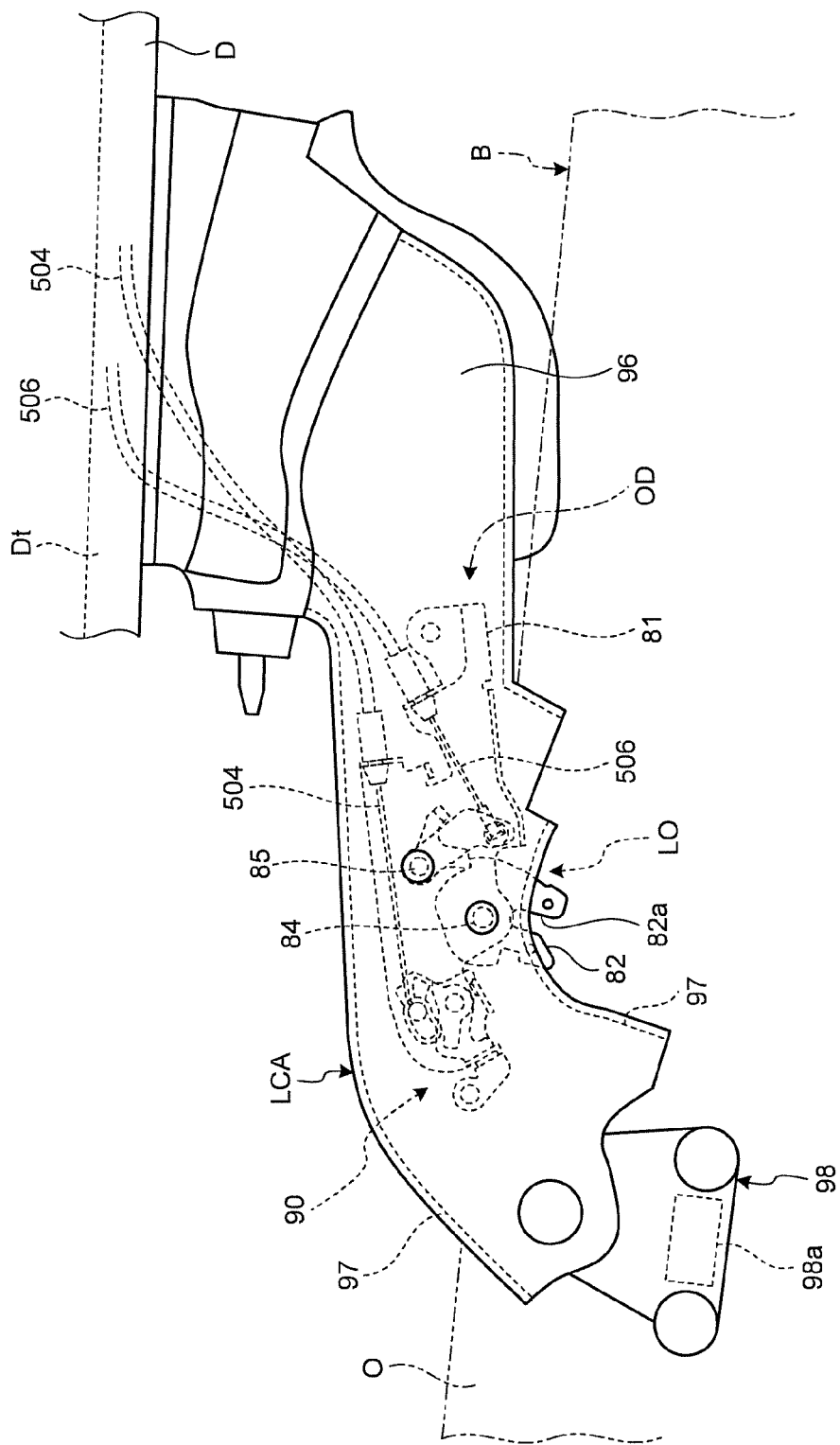
FIG. 13 is a plan view of a lower arm.
Figure 14:
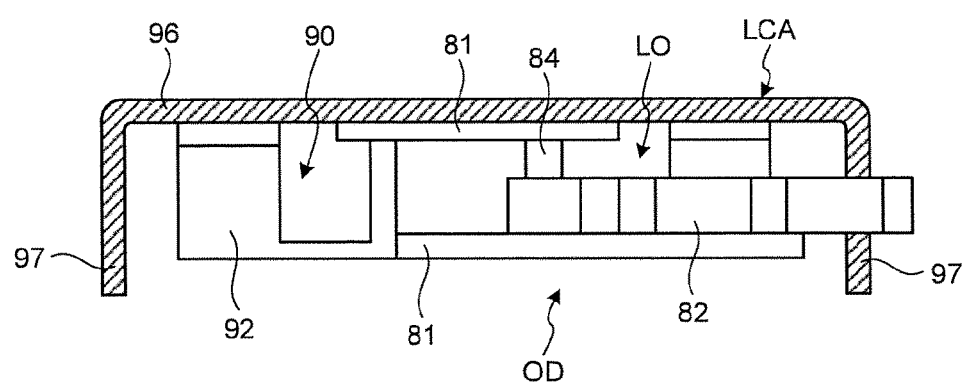
FIG. 14 is a cross section diagram of the lower arm.

The fully opening latch device OD is a device, which engages with a striker S2 (see FIG. 10 and FIG. 11) provided on the body B side and is for retaining the door D in the fully opened position. As illustrated in FIG. 9, the fully opening latch device OD has a base plate 81 made of metal. At an inner surface side of the base plate 81, an opening latch mechanism LO including a fully opening latch (second latch) 82 and a ratchet (second ratchet) 83 is provided. The fully opening latch device OD is attached to a lower surface of the lower arm LCA (FIG. 13 and FIG. 14). The lower arm LCA is a bracket, which slidably supports the door D with respect to the door opening O and which is made of metal.

The fully opening latch 82 is pivotally supported by a latch shaft 84 directed in a vertical direction and engages with the striker S2 at an engagement groove 82a thereof when the door D is fully open. The ratchet 83 is pivotally supported by a ratchet shaft 85 directed in the vertical direction and is engageable with an engagement portion 82b provided on an outer periphery of the fully opening latch 82. The ratchet shaft 85 pivotally supports a release input lever 86 so that the release input lever 86 overlaps the ratchet 83. One end of the latch shaft 84 and ratchet shaft 85 is held by the base plate 81 and the other end thereof is held by a support plate 87. At a position, which is closer to the opening latch interlocking mechanism 90, than the engagement portion 82b is, on the outer periphery of the fully opening latch 82, a protrusion 82c is provided in a protruding manner.

Figure 10:
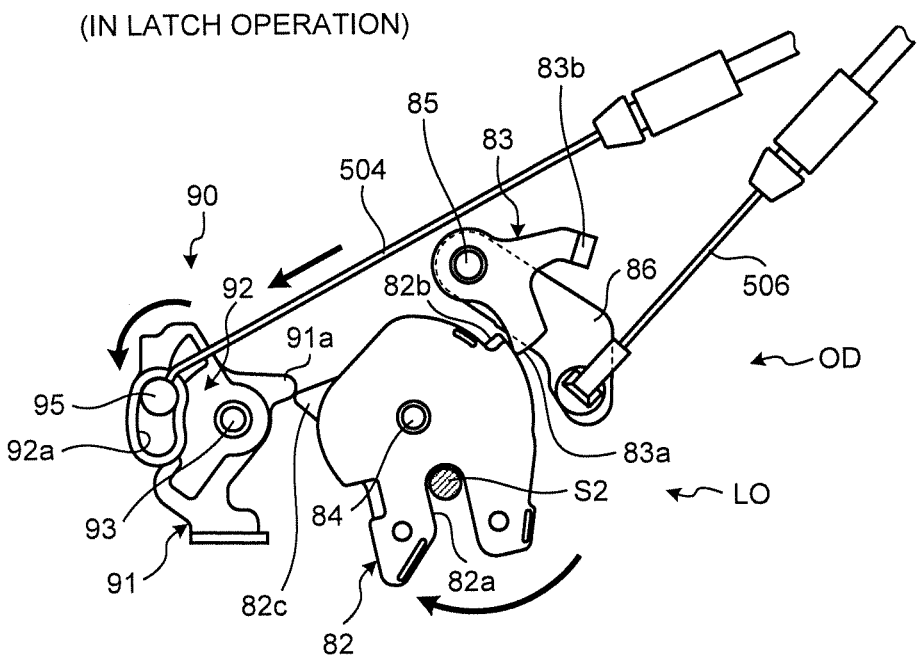
FIG. 10 is a diagram illustrating a state during latch operation of the fully opening latch device and opening latch interlocking mechanism.

As the fully opening latch 82 rotationally moves by a predetermined angle in a latching direction (clockwise direction in FIG. 9) against urging force of a spring 88, into which the latch shaft 84 is inserted, from an unlatched position (see FIG. 9) off from the striker S2; the fully opening latch 82 is brought into a position slightly engaged with the striker S2 (see FIG. 10). As the fully opening latch 82 rotationally moves in the latching direction further, the fully opening latch 82 is brought into a latched position (see FIG. 11) where the fully opening latch 82 is completely engaged with the striker S2. The latched position of the fully opening latch 82 corresponds to a fully opened state of the door D.

The ratchet 83 is urged at all times in an engagement direction (clockwise direction in FIG. 9, for example) by urging force of a spring 89, in which the ratchet shaft 85 is inserted. The ratchet 83 has, at distal ends of portions protruding in two directions in an approximate V-shape from the ratchet shaft 85, a claw portion 83a and a bent portion 83b. The claw portion 83a abuts against an outer periphery of the fully opening latch 82 when the fully opening latch 82 is at the unlatched position illustrated in FIG. 9. The claw portion 83a is retained in an engaged position where the claw portion 83a engages with the engagement portion 82b of the fully opening latch 82 and prevents rotational movement of the fully opening latch 82 in an unlatching direction (anticlockwise direction in FIG. 11), when the fully opening latch 82 is at the latched position illustrated in FIG. 11. Since an engaged state between the fully opening latch 82 and the striker S2 is retained when the ratchet 83 is brought into the engaged position where the ratchet 83 engages with the engagement portion 82b of the fully opening latch 82, the door D is retained in the fully opened state.

The release input lever 86 is coupled to a closure inside lever 111 (see FIG. 15) of the operation relay device 100 via the cable 506 routed into the door D along the lower surface of the lower arm LCA.

Figure 12:
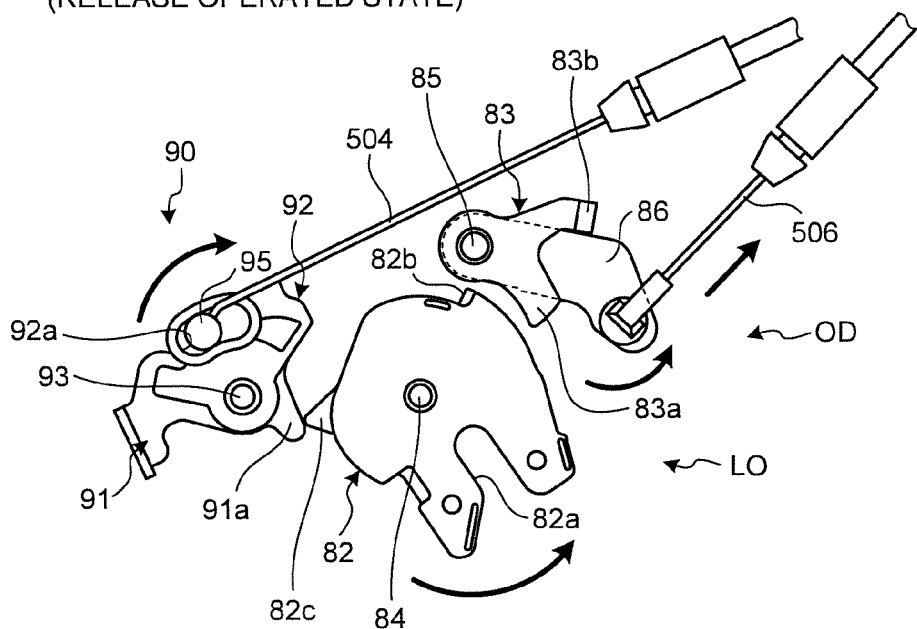
FIG. 12 is a diagram illustrating a release operated state of the fully opening latch device and opening latch interlocking mechanism.

If door closing operation is performed on the inside handle IH when the door D is in the fully opened state and the operation relay device 100 is in the unlocked state, the closure inside lever 111 performs release operation. This release operation is transmitted to the release input lever 86 via the cable 506 and the release input lever 86 rotationally moves in the release direction (anticlockwise direction) as illustrated in FIG. 12. As a result, a side edge portion of the release input lever 86 presses the bent portion 83b of the ratchet 83 and thus the ratchet 83 rotationally moves in the anticlockwise direction to a released position as illustrated in FIG. 12. Thereby, the engaged state between the fully opening latch 82 and ratchet 83 is canceled, and the fully opening latch 82 is rotationally moved in the unlatching direction by the urging force of the spring 88 to be brought into the unlatched position.

3.2 Description of Opening Latch Interlocking Mechanism

As illustrated in FIG. 9, the opening latch interlocking mechanism (release cancel output mechanism) 90 is installed in parallel with the opening latch mechanism LO, on an inner surface of the base plate 81 of the fully opening latch device OD. The opening latch interlocking mechanism 90 performs release cancel operation in association with movement of the opening latch mechanism LO from the unlatched position to the latched position. This release cancel operation is transmitted to the relay mechanism 117 via the cable 504 (see FIG. 15). The relay mechanism 117 cancels the release restrained state and enables closure of the door D, when the release cancel operation is input from the opening latch interlocking mechanism 90.

The opening latch interlocking mechanism (interlocking mechanism) 90 includes a cam lever 91 and a cancel lever 92.

The cam lever 91 is pivotally supported by a shaft 93 that is in the vertical direction, and the cam lever 91 is urged at all times in the clockwise direction in FIG. 9 by a spring (urging member) 94, in which the shaft 93 is inserted. The cam lever 91 has a receiving portion 91a, which protrudes to a fully opening latch 82 side and which has a distal end that is arc shaped. The cancel lever 92 rotationally moves, integrally with the cam lever 91. The cancel lever 92 has a long hole 92a, in which a coupling pin (connecting portion) 95 provided at one end of the cable 504 is movably inserted, and which is arc shaped. As illustrated in FIG. 9, when the door D is at the closed position and the fully opening latch 82 is in the unlatched state, the coupling pin 95 is at a position where the coupling pin 95 abuts against a proximal edge portion of the long hole 92a. The cam lever 91 and the cancel lever 92 may be integrally formed.

When the fully opening latch 82, which is at the unlatched position illustrated in FIG. 9, abuts against the striker S2 and rotationally moves in the latching direction (clockwise direction) just before the door D is brought into the fully opened position as the door D is moved for opening from the fully closed position, the protrusion 82c of the fully opening latch 82 presses the receiving portion 91a of the cam lever 91. Thereby, the cam lever 91 and the cancel lever 92 performs rotational movement by a predetermined angle (hereinafter, referred to as "release cancel operation") in a cancel direction (anticlockwise direction) as illustrated in FIG. 10, and the coupling pin 95 is pulled and moved by the edge portion of the long hole 92a. By this movement of the coupling pin 95, the release cancel operation is transmitted to a disconnecting lever 120 (see FIG. 15) of the relay mechanism 117 via the cable 504. As a result, the relay mechanism 117 is switched over from a connected state to a disconnected state as described later, and a release operation transmission path for transmitting release operation of the release electric mechanism R to the ratchet 9 of the closing latch mechanism LC is disconnected.

The release operation transmission path according to this embodiment is a path joining the release output lever 41, the cable 503, the relay mechanism 117, a coupling rod 128 (see FIG. 15), a lever mechanism 103 (release relay lever 116) of the operation relay device 100, the cable 501, the release input lever 19, and the ratchet 9, and of this path, the relay mechanism 117 is connected or disconnected.

When the fully opening latch 82 rotationally moves further in the latching direction (clockwise direction) from the position illustrated in FIG. 10, the protrusion 82c overrides the receiving portion 91a. As a result, the cam lever 91 and the cancel lever 92 returns to an initial position by urging force of a spring 94 as illustrated in FIG. 11, and as that happens, the cable 504 also returns to an initial position and the fully opening latch 82 engages with the ratchet 83 to be in the latched position.

Figure 11:
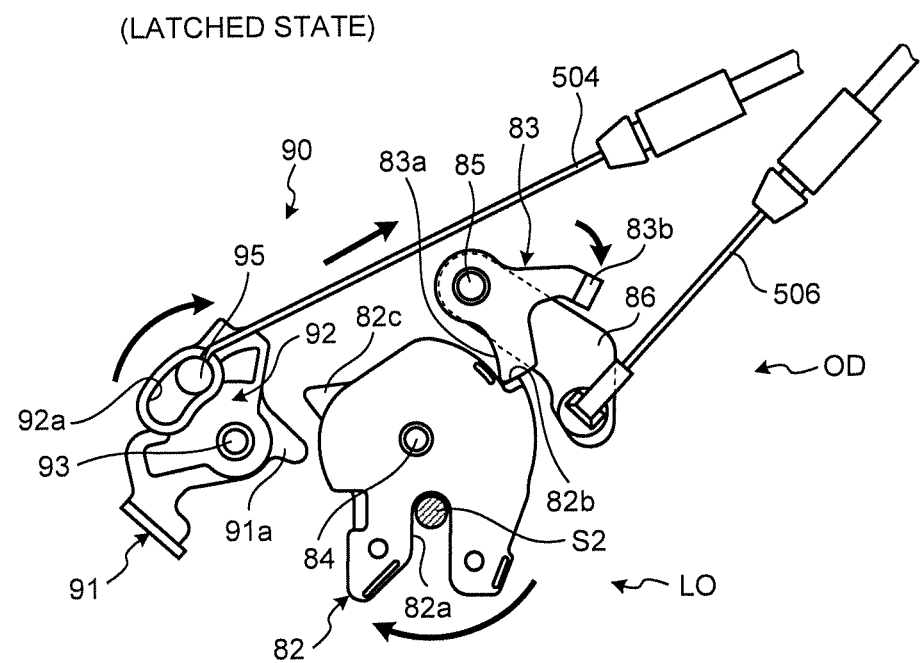
FIG. 11 is a diagram illustrating a state of a latched state of the fully opening latch device and opening latch interlocking mechanism.

On the contrary, if door closing operation is performed on the inside handle IH when the door D is in the fully opened state, the release input lever 86 rotationally moves in the release direction (anticlockwise direction) as illustrated in FIG. 12 from the state illustrated in FIG. 11 via the closure inside lever 111 and the cable 506. As a result, since the ratchet 83 is moved to the released position, the fully opening latch 82 is rotationally moved in the unlatching direction by the urging force of the spring 88.

When the fully opening latch 82 rotationally moves in the unlatching direction, as illustrated in FIG. 12, the protrusion 82c of the fully opening latch 82 presses the receiving portion 91a of the cam lever 91, and rotationally moves the cam lever 91 and the cancel lever 92 by a predetermined angle in the clockwise direction. Upon this operation, since the long hole 92a of the cancel lever 92 does not hit the coupling pin 95 and the coupling pin 95 is not moved, pulling force is not caused on the cable 504.

Accordingly, the opening latch interlocking mechanism 90 causes the release cancel operation according to the operation of the fully opening latch 82 upon the opening operation of the door D and transmits this release cancel operation to the relay mechanism 117 via the cable 504. On the contrary, the release cancel operation is not caused by the operation of the fully opening latch 82 upon closing operation of the door D, and transmission of motive power to the relay mechanism 117 is not caused.

As illustrated in FIG. 13 and FIG. 14, the lower arm LCA includes a plate 96, which is arranged along a horizontal direction, and flanges 97 and 97, which protrude downward from both side edge portions of the plate 96. The fully opening latch device OD and the opening latch interlocking mechanism 90 are attached to a position, which is on a lower surface (back side) of the plate 96 and at an inner side the flanges 97 and 97.

As illustrated in FIG. 13, at one end of the lower arm LCA, a slide mechanism 98, which has a roller 98a that slides on a bottom surface of the door opening O of the body B, is provided in a swingable state. The other end of the lower arm LCA is fixed to the door D. The cables 504 and 506 from the opening latch interlocking mechanism 90 and fully opening latch device OD attached to the lower surface of the plate 96 are lead to the door D along the lower surface of the plate 96, are routed inside the door trim Dt, and are respectively connected to the operation relay device 100 and the relay mechanism 117.

As described above, since the opening latch interlocking mechanism 90, which causes the release cancel operation for canceling the release restrained state, is, together with the fully opening latch device OD, attached to the lower surface of the lower arm LCA, the opening latch interlocking mechanism 90 is able to be installed in the vehicle V without getting in the way of the installation space of various elements, such as the rear door latch device 1 and the relay mechanism 117, which are installed in the door D. Further, since the fully opening latch device OD and the opening latch interlocking mechanism 90 are attached to the lower surface of the plate 96 at the position at the inner side the flanges 97, they are able to be hidden inside the flanges 97 and are able to be prevented from being stepped on and damaged upon getting on/off, and the like. By routing the cable 504 coupling the opening latch interlocking mechanism 90 and the relay mechanism 117 from the lower surface of the lower arm LCA into the door trim Dt, this cable 504 is able to be prevented from being externally exposed and at the same time, the opening latch interlocking mechanism 90 and the relay mechanism 117 are able to be smoothly operated.

4. Description of Operation Relay Device

Figure 15:
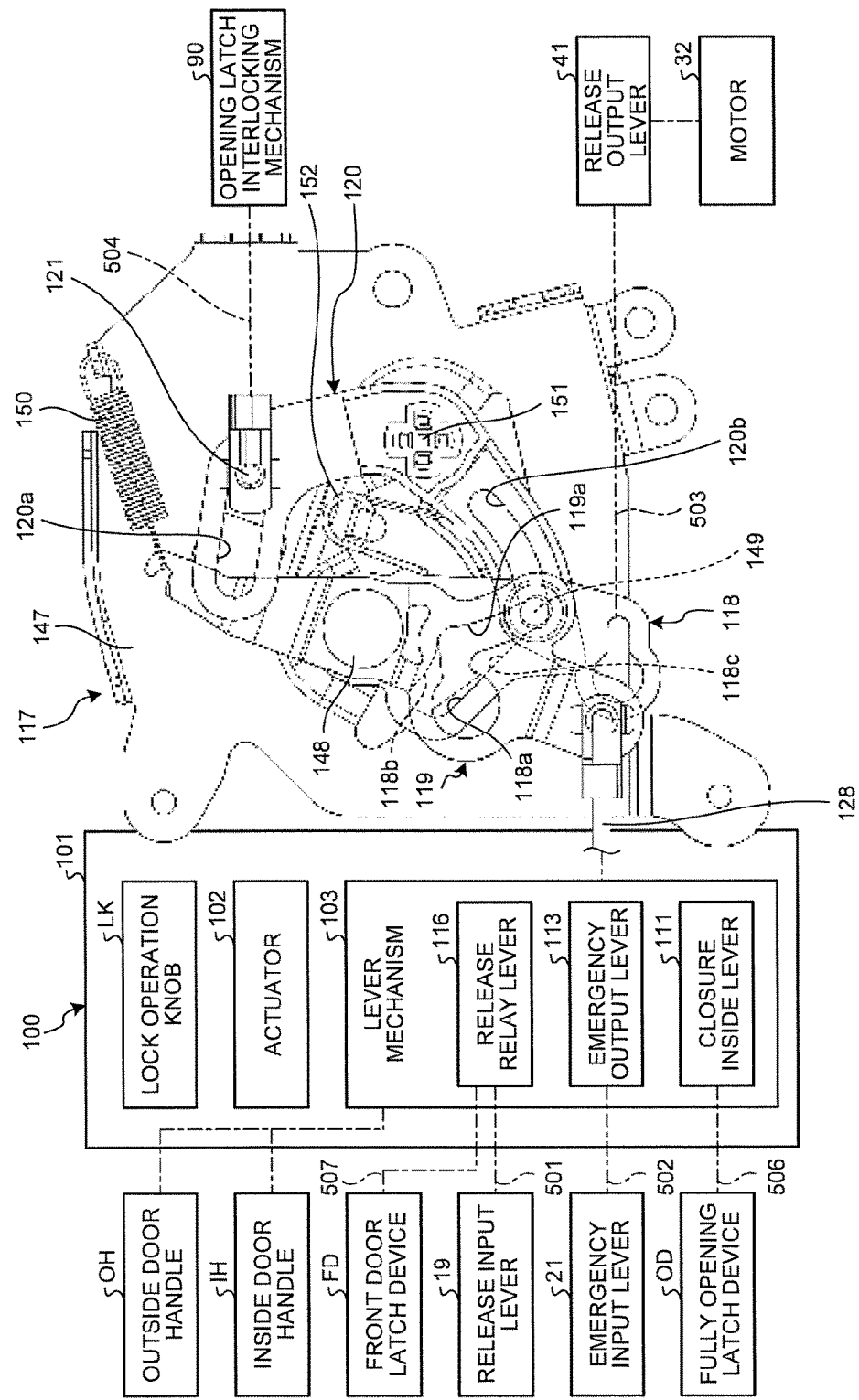
FIG. 15 is a diagram illustrating a configuration of an operation relay device and a release cancel input relay mechanism.

FIG. 15 is a diagram illustrating a configuration of the operation relay device 100 and the relay mechanism 117. FIG. 15 illustrates the operation relay device 100 with a block configuration diagram and illustrates a side view of the relay mechanism 117 as viewed from inside the vehicle.

As illustrated in FIG. 15, the operation relay device 100 includes a base plate 101, which is fixed in the door D and is made of metal. The operation relay device 100 supports, with the base plate 101, the lock operation knob LK, an actuator 102, and the lever mechanism 103.

The lock operation knob LK performs slide movement to an unlocked position and a locked position by manual operation from inside the vehicle and selectively switch over the lever mechanism 103 between the unlocked state and the locked state. The switch over between the unlocked state and the locked state of the lever mechanism 103 is also able to be performed by driving of the actuator 102. The actuator 102 operates by unlocking operation and locking operation of the operating switch provided at an appropriate place in the vehicle V or the portable wireless operating switch.

If opening operation is performed on the outside handle OH installed outside the vehicle, a group of levers forming the lever mechanism 103 operate as appropriate, the motor 32 of the release electric mechanism R and the electric opening and closing device PSD are driven and controlled for opening under control by the control unit C, and the door operates to be opened.

Opening operation and closing operation of the door D are able to be performed on the inside handle IH installed inside the vehicle. When opening operation is performed on the inside handle IH, the group of levers forming the lever mechanism 103 operate as appropriate, and the motor 32 of the release electric mechanism R and the electric opening and closing device PSD are driven and controlled for opening under control by the control unit C, and the door D operates to be opened. When closing operation is performed on the inside handle IH, the group of levers forming the lever mechanism 103 operate as appropriate, the fully opening latch device OD performs release operation via the closure inside lever 111 and the cable 506, and the door D is operated to be closed by driving and controlling of the electric opening and closing device PSD for closure.

The release relay lever 116 is respectively coupled to the release input lever 19 of the rear door latch device 1 and a release lever (not illustrated in the figures) of the front door latch device FD, via the cables 501 and 507. When the lever mechanism 103 is in the unlocked state, the release operation of the release relay lever 116 is transmitted to each of the release input lever 19 of the rear door latch device 1 and the release lever of the front door latch device FD.

The emergency output lever 113 is coupled to the emergency input lever 21 of the rear door latch device 1 via the cable 502 (see FIG. 3). When the emergency output lever 113 performs release operation, the block lever 20 is moved to the cancel position as described above, and the closing operation of the closer and release unit 3 is interrupted.

5. Description of Release Cancel Input Relay Mechanism

Figure 16:
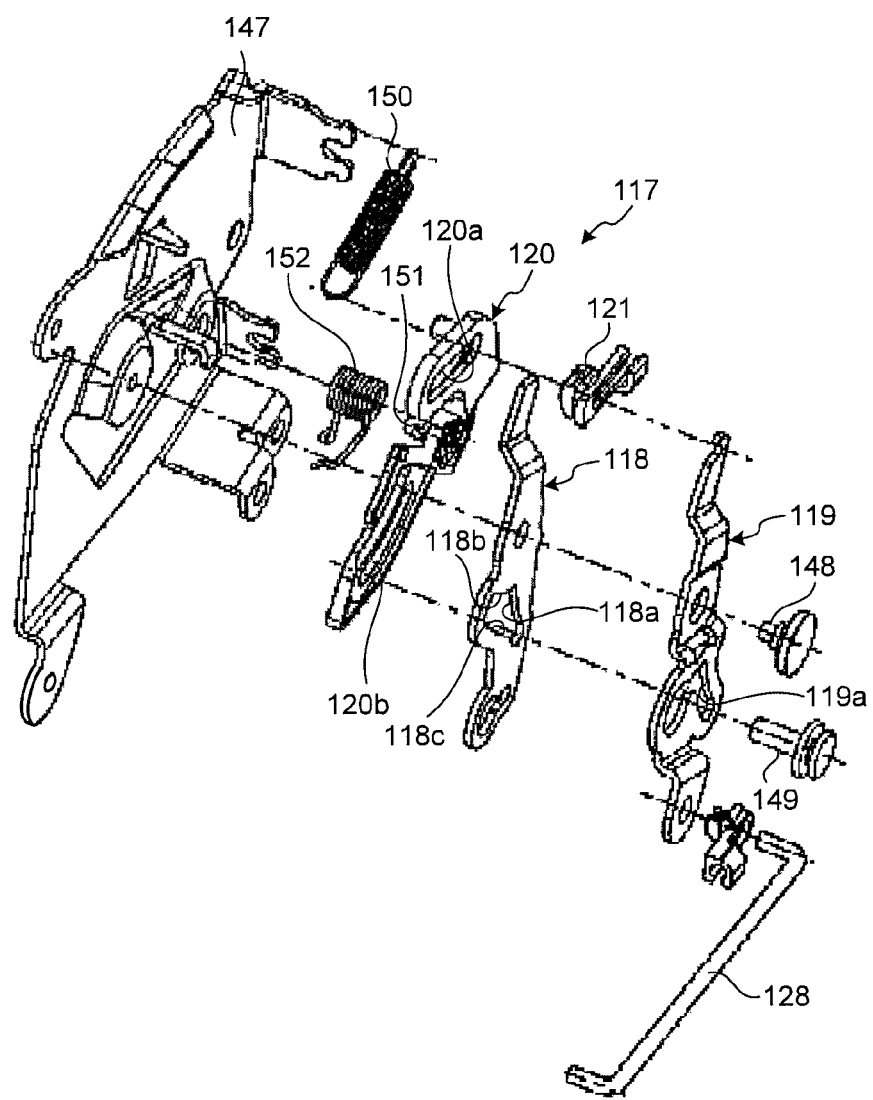
FIG. 16 is an exploded perspective view of the release cancel input relay mechanism.

As illustrated in FIG. 15 and FIG. 16, the relay mechanism (release transmission mechanism) 117 includes a support plate 147, which is made of metal. The relay mechanism 117 supports, with the support plate 147, the relay lever 118, a transmission lever 119, and the disconnecting lever 120. In this embodiment, the relay mechanism 117 is attached to the base plate 101 of the operation relay device 100 by the support plate 147. The relay mechanism 117 may be attached to a component other than the operation relay device 100, for example, to a panel or the like of the door D.

The relay mechanism 117 is able to switch over between the connected state and the disconnected state, the connected state connecting the release operation of the release output lever 41 by the release driving of the motor 32 to be transmittable to the rear door latch device 1 and front door latch device FD, and the disconnected state disconnecting it to be untransmittable. If, during the release driving of the motor 32, an electric trouble, such as motor failure or sticking, occurs in the release electric mechanism R and the closing latch mechanism LC stays stopped in a release operated state, the release restrained state where the door D becomes unable to be retained occurs. In this case, by the relay mechanism 117 switching over to the disconnected state and the release operation transmission path for transmitting the release operation of the release electric mechanism R to the ratchet 9 being disconnected, the release restrained state is canceled and the door D becomes able to be retained.

The relay lever 118 is pivotally supported on the support plate 147 by a shaft 148 directed in the vehicle's inside-outside direction. A lower end portion of the relay lever 118 is coupled to the release output lever 41 of the rear door latch device 1 via the cable 503. The relay lever 118 moves in association with the release operation of the release output lever 41 by the release driving of the motor 32, performs rotational movement by a predetermined angle (hereinafter, referred to as "release operation") in an anticlockwise direction from a standby position illustrated in FIG. 15, and moves to a released position illustrated in FIG. 17.

At a lower portion of the relay lever 118, a control hole 118a in the vertical direction is provided. The control hole 118a is a hole portion that is approximately triangular shaped. The control hole 118a has: a non-hitting portion 118b, which extends, to an opposite side, from the apex (concave portion) of an approximately L-shaped edge portion at a disconnecting lever 120 side thereof; and an inclined portion 118c, which is gradually inclined downwards from an end portion (end) of the non-hitting portion 118b to the disconnecting lever 120 side. A floating pin 149, which vertically moves by following the operation of the disconnecting lever 120, is slidably engaged with the control hole 118a.

The transmission lever 119 is pivotally supported on the support plate 147 by the shaft 148, which is the same as that of the relay lever 118. When the disconnecting lever 120 is at a connected position illustrated in FIG. 15 and FIG. 17, that is, when the relay mechanism 117 is in the connected state, the transmission lever 119 is able to move in association with the release operation of the relay lever 118. By this associative movement, against urging force of a spring 150, the transmission lever 119 performs rotational movement by a predetermined angle in an anticlockwise direction (hereinafter, referred to as "release operation"), together with the relay lever 118, from the standby position illustrated in FIG. 15, and moves to the released position illustrated in FIG. 17.

A lower end portion of the transmission lever 119 is coupled to the lever mechanism 103 of the operation relay device 100 via the coupling rod 128. By the release operation from the transmission lever 119 being transmitted via the coupling rod 128, the lever mechanism 103 performs release operation, and this release operation is transmitted to the rear door latch device 1 and the front door latch device FD.

At a lower portion of the transmission lever 119, a long hole 119a in the vertical direction is provided. The floating pin 149 is slidably engaged with the long hole 119a.

The disconnecting lever 120 is an approximately U-shaped lever, which is pivotally supported on the support plate 147 by a shaft 151 directed in the vehicle's inside-outside direction. A top end portion of the disconnecting lever 120 is coupled to the cancel lever 92 of the opening latch interlocking mechanism 90 via the cable 504. When the cancel lever 92 of the opening latch interlocking mechanism 90 performs the release cancel operation in the cancel direction as described above, the disconnecting lever 120 is able to move in association with this release cancel operation. By this associative movement, the disconnecting lever 120 moves to a disconnected position illustrated in FIG. 18, where the disconnecting lever 120 has rotationally moved by a predetermined angle in a clockwise direction against urging force of a spring 152 from the connected position illustrated in FIG. 15.

At an upper end portion of the disconnecting lever 120, a long hole 120a, in which a coupling pin 121 provided at the other end of the cable 504 is movably inserted, is formed. At the connected position illustrated in FIG. 15 and the disconnected position illustrated in FIG. 18, the coupling pin 121 is at a position at which the coupling pin 121 abuts against a proximal edge portion of the long hole 120a. As described above, if the fully opening latch 82 of the fully opening latch device OD operates upon operation of the door D for closure, in the opening latch interlocking mechanism 90, by working of the long hole 92a of the cancel lever 92, the release cancel operation is not caused. Thus, in this embodiment, by enabling also the coupling pin 121, which serves as a connecting portion to the relay mechanism 117 for the cable 504 for transmission of this release cancel operation, to move in the long hole 120a, operation of the disconnecting lever 120 upon operation of the fully opening latch 82 in the unlatching direction is more infallibly prevented. One end or the other end of the cable 504 is movable, and one of the long holes 92a and 120a may be a circular hole portion, which unmovably retains the coupling pin 95 or 121.

At a lower end portion of the disconnecting lever 120, a long hole 120b, which is arc shaped, is formed. The floating pin 149 is slidably engaged with the long hole 120b.

The floating pin 149 is slidably inserted in the control hole 118a of the relay lever 118, the long hole 119a of the transmission lever 119, and the long hole 120b of the disconnecting lever 120.

When the disconnecting lever 120 is at the connected position illustrated in FIG. 15, the floating pin 149: is positioned at a lower edge portion of the control hole 118a of the relay lever 118; connects the release operation transmission path between the relay lever 118 and the transmission lever 119; and enables the release operation of the relay lever 118 on the transmission lever 119.

Figure 18:
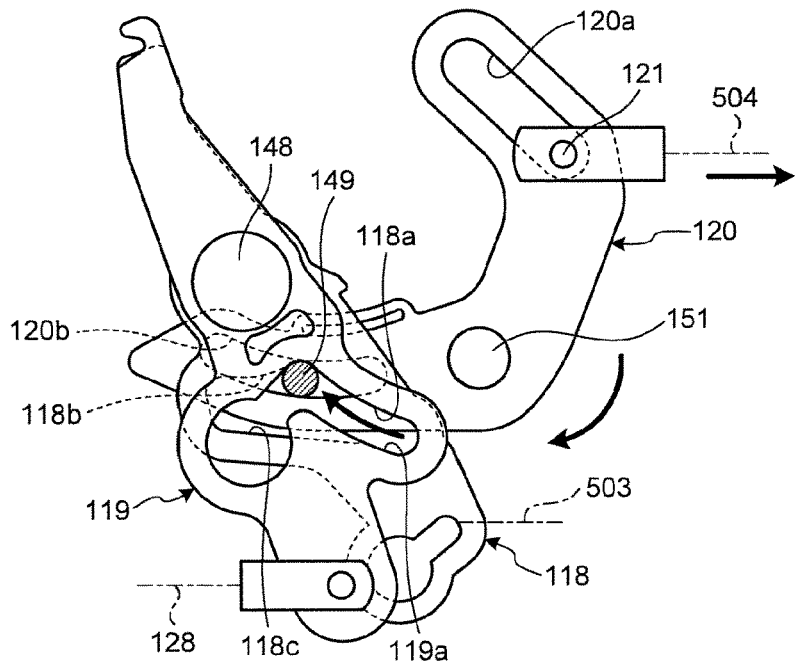
FIG. 18 is a diagram illustrating the release cancel input relay mechanism that has been brought into a disconnected state upon the release operation.
Figure 19:
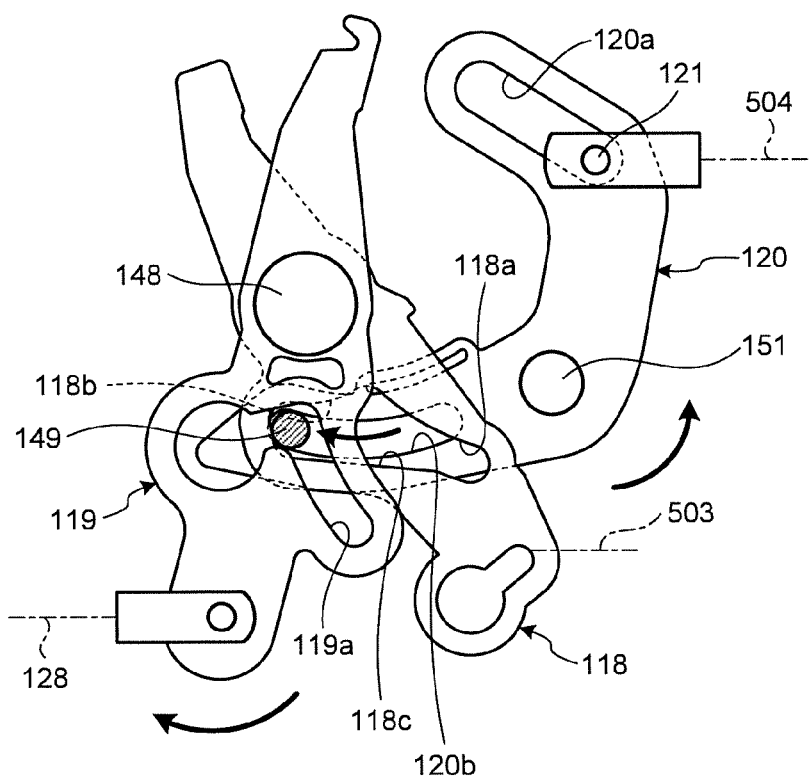
FIG. 19 is a diagram illustrating a state where release cancel operation of the opening latch interlocking mechanism has been transmitted to the release cancel input relay mechanism.

As illustrated in FIG. 18, if the disconnecting lever 120 has moved from the connected position to the disconnected position when the relay lever 118 and the transmission lever 119 are in the release operated state, the floating pin 149 moves up in the control hole 118a along the long hole 119a. Thereby, the floating pin 149 moves, as illustrated in FIG. 18, to a position, which is a starting end of the non-hitting portion 118b of the control hole 118a (the apex of the L-shaped edge portion of the control hole 118a). When the floating pin 149 is at this position, while the floating pin 149 is able to move in the control hole 118a along the non-hitting portion 118b and is also able to move in the long hole 120b of the disconnecting lever 120, the floating pin 149 is unable to move in the long hole 119a of the transmission lever 119. Therefore, the transmitted state between the relay lever 118 and the transmission lever 119 is canceled and the release operation transmission path is disconnected, and thus even if the relay lever 118 is in the release operated state as illustrated in FIG. 19, returning of the transmission lever 119 and the lever mechanism 103 coupled thereto with the coupling rod 128 to the standby position becomes possible.

6. Description of Action of Vehicle Door Opening and Closing Apparatus

Next, action of the vehicle door opening and closing apparatus DO according to this embodiment will be described.

6.1 Release Operation by Handle Operation when Door is in Fully Closed State

If opening operation is performed on the outside handle OH or inside handle IH when the door D is in the fully closed position and the operation relay device 100 is in the unlocked state, this opening operation is transmitted to the lever mechanism 103 of the operation relay device 100 (see FIG. 15). As a result, the release relay lever 116 performs release operation via the group of levers of the lever mechanism 103, and this release operation is transmitted to the rear door latch device 1 and the front door latch device FD via the cables 501 and 507.

In the rear door latch device 1, the release input lever 19 performs release operation as illustrated in FIG. 7 from the standby position illustrated in FIG. 6. Thereby, the ratchet 9 moves to the released position, the engaged state between the ratchet 9 and the latch 7 is canceled, and the closing latch mechanism LC performs release operation. Simultaneously therewith, the front door latch device FD also performs release operation and thus opening of the door D becomes possible.

6.2 Release Operation by Handle Operation when Door is in Fully Opened State

If closing operation is performed on the inside handle IH when the door D is in the fully opened position and the operation relay device 100 is in the unlocked state, this closing operation is transmitted to the lever mechanism 103 of the operation relay device 100 (see FIG. 15). As a result, the closure inside lever 111 performs release operation via the group of levers of the lever mechanism 103 and this release operation is transmitted to the fully opening latch device OD via the cable 506.

In the fully opening latch device OD, the release input lever 86 performs release operation as illustrated in FIG. 12 from the latched position illustrated in FIG. 11. Thereby, the ratchet 83 moves to the released position, the engaged state between the ratchet 83 and the fully opening latch 82 is canceled, and the opening latch mechanism LO performs release operation, and thus closing of the door D becomes possible.

6.3 Release Operation by Release Electric Mechanism

If opening operation is performed on the operating switch provided inside the vehicle or on the wireless operating switch when the door D is at the fully closed position and the closing latch mechanism LC is in the fully latched state, the motor 32 forming the release electric mechanism R performs release driving. As a result, the sector gear 39 rotationally moves in the release direction (clockwise direction) as illustrated in FIG. 7 from the state illustrated in FIG. 6 and the sun gear 35 rotationally moves by a predetermined angle in the release direction from the neutral position in association with the rotation of the planetary gear 36 on its axis in the clockwise direction.

As illustrated in FIG. 7, the abutting portion 35b of the sun gear 35, which has rotationally moved in the release direction, presses the release portion 41a of the release output lever 41. Thereby, the release output lever 41 performs release operation against the urging force of the spring 46 from the standby position. This release operation is transmitted, via the cable 503, to the relay lever 118 of the relay mechanism 117, which is in the connected state.

Figure 17:
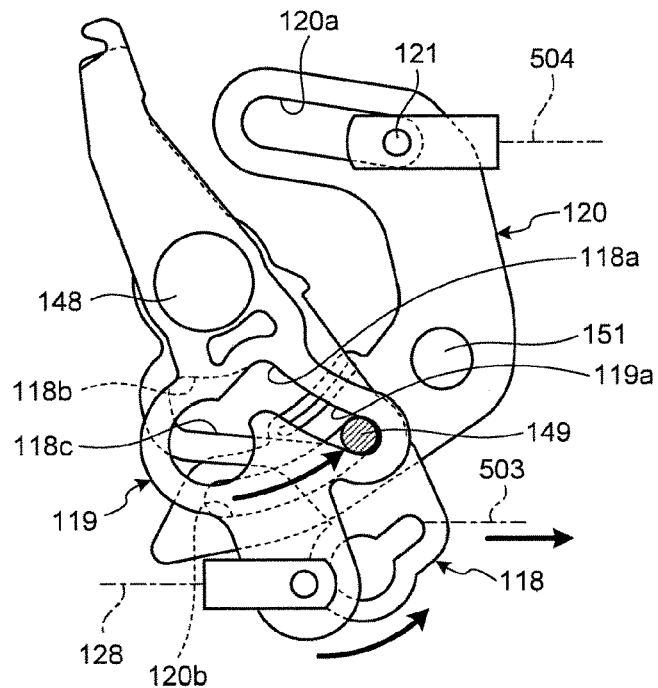
FIG. 17 is a diagram illustrating release operation of the release cancel input relay mechanism that is in a connected state.

As the release operation of the release output lever 41 is transmitted, the relay lever 118 performs release operation as illustrated in FIG. 17 from the standby position illustrated in FIG. 15. As the relay lever 118 performs release operation, the transmission lever 119 also performs release operation under the engagement action of the floating pin 149. This release operation is transmitted to the lever mechanism 103 of the operation relay device 100 via the coupling rod 128 and causes release operation of the release relay lever 116.

The release operation of the release relay lever 116 is transmitted to the rear door latch device 1 and front door latch device FD via the cables 501 and 507. In the rear door latch device 1, the release input lever 19 performs release operation as illustrated in FIG. 7 from the standby position illustrated in FIG. 6. Thereby, the ratchet 9 is moved to the released position, the engaged state between the ratchet 9 and the latch 7 is canceled, and the closing latch mechanism LC becomes disengageable from the striker S1. Simultaneously therewith, the front door latch device FD also performs release operation and thus opening of the door D becomes possible.

As illustrated in FIG. 3, the sector gear 39 and the sun gear 35 rotate reversely to return to the neutral position, and the release output lever 41, which has been performing the release operation, returns to the standby position. Accordingly, the release electric mechanism R returns from the release operated state to the standby state, and the other elements that have been performing the release operation return to their respective standby positions.

6.4 Release Cancel Operation when Release Restrained State is Canceled

If there is no operation failure when the release output lever 41 has performed release operation by the release driving of the motor 32 in a case where the door D is operated for opening from the fully closed position, various elements return to the neutral position or standby position by the reverse rotation driving of the motor 32. Therefore, the ratchet 9 becomes engageable with the full latch engagement portion 7a or the half latch engagement portion 7b upon closing operation of the door D thereafter.

However, as illustrated in FIG. 7, if operation failure occurs in a state where the ratchet 9 has moved to the released position by the release driving of the motor 32, the reverse rotation of the motor 32 may become impossible. If that happens, the release output lever 41 stops in a state where the release output lever 41 has performed release operation, and the release restrained state, where the ratchet 9 stops at the released position and is unable to return to the engaged position with the latch 7, is caused. If this release restrained state is caused, since the ratchet 9 stops at the released position and is unable to move to the engaged position at which the ratchet 9 engages with the latch 7, the door D becomes unable to be retained in the closed position. Detection of such operation failure may be made, for example, if detection signal by a detection switch for detecting the released position of the ratchet 9 has continued for a certain time period or longer, or if detection has not been made by the detection switch 48 that detects the neutral position of the sector gear 39.

In the vehicle door opening and closing apparatus DO according to this embodiment, by including the relay mechanism 117 and the opening latch interlocking mechanism 90, even if the release restrained state is caused when the door D is operated for opening, this is able to be canceled and the door D is able to be retained in the closed position.

Specifically, even if the above described release operation is performed and the rear door latch device 1 and the relay mechanism 117 are respectively in the state of being stopped at the positions illustrated in FIG. 7 and FIG. 17, that is, even if the release restrained state is caused, the door D is able to be directly operated for opening to the fully opened position. Therefore, at a timing just before the door D is brought into the fully opened position, the opening latch mechanism LO of the fully opening latch device OD is brought into the latched state, and when that happens, the opening latch interlocking mechanism 90 performs the release cancel operation.

The release cancel operation of the opening latch interlocking mechanism 90 is transmitted to the disconnecting lever 120 of the relay mechanism 117, which is in the connected state illustrated in FIG. 17, via the cable 504, from the cancel lever 92, which rotationally moves in the cancel direction.

The disconnecting lever 120, to which the release cancel operation has been transmitted, moves to the disconnected position from the connected position, as illustrated in FIG. 18. As this happens, the floating pin 149 is followingly moved by being pressed by the long hole 120a of the disconnecting lever 120 that moves to the disconnected position. That is, the floating pin 149 moves up along the control hole 118a of the relay lever 118 and the long hole 119a of the transmission lever 119, and moves to the position (see FIG. 18), which is the starting end of the non-hitting portion 118h of the control hole 118a. In this state, when the transmission lever 119 moves to the standby position, the floating pin 149 is pressed by the long hole 119a, is able to move in the control hole 118a along the non-hitting portion 118b, and is also able to move in the long hole 120b. Thereby, the transmission path between the relay lever 118 and the transmission lever 119, that is, the release operation transmission path for transmitting the release operation of the release electric mechanism R to the ratchet 9, is disconnected. As a result, if the release output lever 41 is still stopped in the release operated state at this time point, the transmission lever 119 returns to the standby position by the urging force of the spring 150 with the relay lever 118 being kept in the release operated state as illustrated in FIG. 19. In a normal state where no operation failure is caused, the floating pin 149 returns to the position illustrated in FIG. 17 from the position illustrated in FIG. 18 correspondingly with the operation of the disconnecting lever 120.

Figure 8:
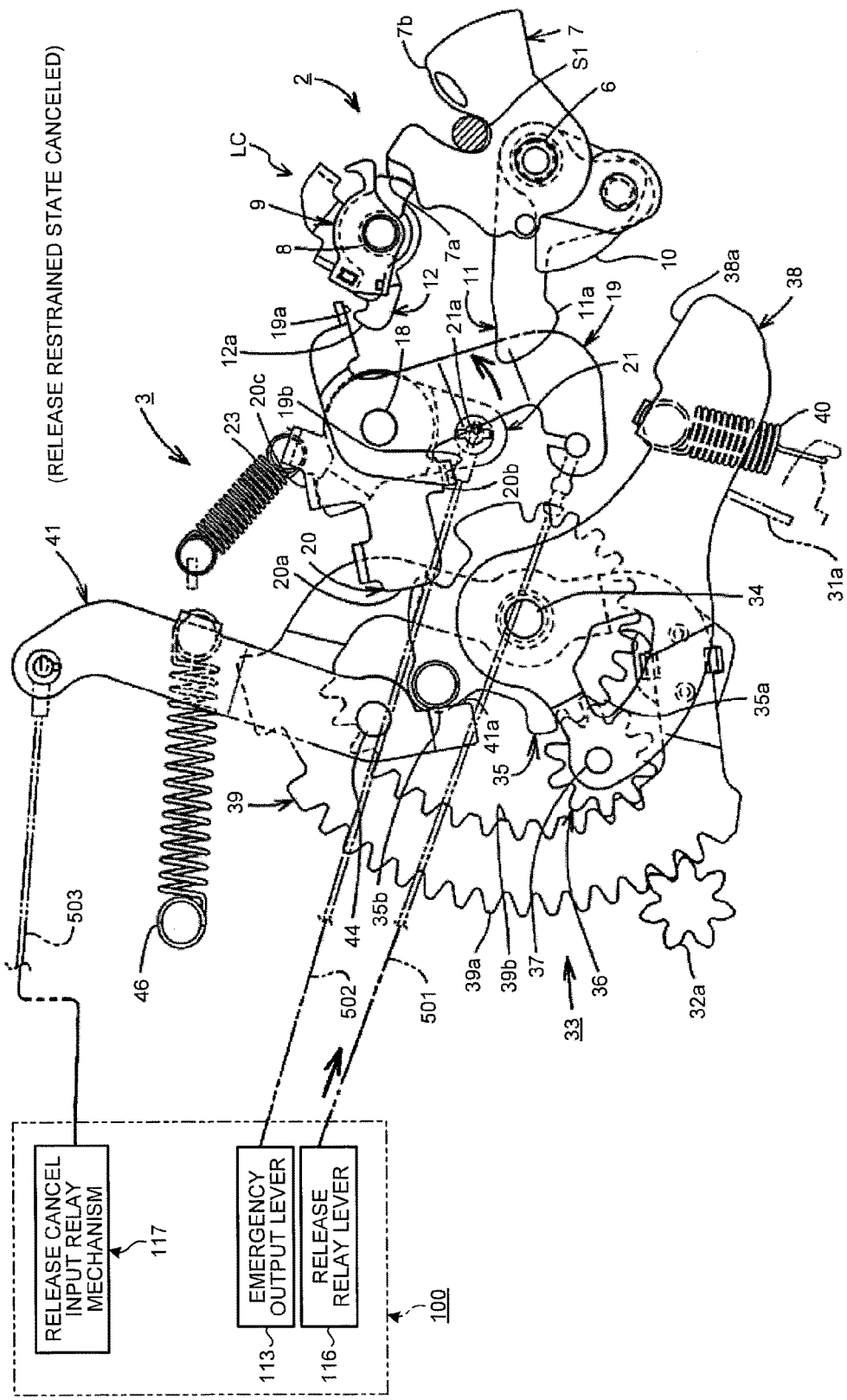
FIG. 8 is a diagram illustrating a state where a release restrained state of the rear door latch device has been canceled.

When the transmission lever 119 returns to the standby position as illustrated in FIG. 19, following this return, the coupling rod 128 returns to the standby position. As a result, the release relay lever 116 forming the lever mechanism 103 of the operation relay device 100 returns to the standby position, and following this return, the release input lever 19 also returns to the standby position as illustrated in FIG. 8. As a result, as illustrated in FIG. 8, with the release output lever 41 being kept restrained in the release operated state, the ratchet 9 becomes returnable. Therefore, if the door D is operated for closure from the fully opened position, the latch 7 engages with the striker S1 and at the same time, the ratchet 9 engages with the latch 7, and the door D is retained in the closed position.

Thereafter, if the failure or the like causing the release restrained state is resolved and the release output lever 41 returns from the release operated state to the standby position, following the movement of the release output lever 41 to the standby position, the relay lever 118 returns from the released position illustrated in FIG. 19 to the standby position. As a result, the control hole 118a of the relay lever 118 and the long hole 119a of the transmission lever 119 return to the positional relation illustrated in FIG. 15. Thereby, the floating pin 149, which is at the end of the non-hitting portion 118b of the control hole 118a, returns, in association with the return of the disconnecting lever 120 to the connected position by the urging force of the spring 152, to the position illustrated in FIG. 15 while slidingly contacting the inclined portion 118c of the control hole 118a. As a result, the relay mechanism 117 is brought into the connected state illustrated in FIG. 15 again. If the above described operation failure occurs, the door D no longer responds when the door D is automatically opened by the electric opening and closing device PSD from the fully closed state and when the door D is automatically closed from the fully opened state. Therefore, since the user is able to easily recognize the occurrence of the failure or the like, repair or the like is able to be requested in a state where the door D is retained in the closed position by the action of the relay mechanism 117 and the opening latch interlocking mechanism 90.

If the release restrained state is to be canceled by the opening operation of the door D as described above, returning noise of the ratchet 83 of the fully opening latch device OD, the transmission lever 119 of the relay mechanism 117, the lever mechanism 103 of the operation relay device 100, and the group of levers of the closer and release unit 3 is generated. On the contrary, since the release cancel operation does not occur, due to the working of the long hole 92a of the cancel lever 92 and the long hole 120a of the disconnecting lever 120, for the operation of the fully opening latch 82 upon closing operation of the door D, the above mentioned returning noise is not generated and a user is prevented from feeling discomfort or unpleasantness.

Further, if operation failure of the motor 32 is detected while the door D is being operated for closure by the electric opening and closing device PSD in the closing direction from the fully opened position, the control unit C performs reverse rotation control on the electric opening and closing device PSD and causes the door D to be operated for opening towards the fully opened position. Thereby, the release restrained state is able to be canceled by the cancel lever 92 of the opening latch interlocking mechanism 90 being caused to operate in the cancel direction and the relay mechanism 117 being switched over to the disconnected state. Therefore, even if the release restrained state is caused during closing operation of the door D, the release restrained state is able to be resolved infallibly, and thereafter, by closing the door D manually, the door D is able to be retained in the closed position.

As described above, in the vehicle door opening and closing apparatus DO according to this embodiment, the release restrained state is able to be canceled, just by a normal operation of opening the door D. Therefore, even if the release restrained state is caused, the door D is able to be retained in the closed position without a special operation being forced on a user.

Of course, the present invention is not limited to the above described embodiment and may be freely modified without departing from the spirit of the present invention.

REFERENCE SIGNS LIST

1 REAR DOOR LATCH DEVICE
2 LATCH UNIT
3 CLOSER AND RELEASE UNIT
7 LATCH
9, 83 RATCHET
19, 86 RELEASE INPUT LEVER
23, 40, 46, 88, 89, 94, 150 SPRING
32 MOTOR
41 RELEASE OUTPUT LEVER
82 FULLY OPENING LATCH
90 OPENING LATCH INTERLOCKING MECHANISM
91 CAM LEVER
92 CANCEL LEVER
92a, 119a, 120a, 120b LONG HOLE
95, 121 COUPLING PIN
96 PLATE
97 FLANGE
98 SLIDE MECHANISM
100 OPERATION RELAY DEVICE
116 RELEASE RELAY LEVER
117 RELEASE CANCEL INPUT RELAY MECHANISM
118 RELAY LEVER
118a CONTROL HOLE
118b NON-HITTING PORTION
118c INCLINED PORTION
119 TRANSMISSION LEVER
120 DISCONNECTING LEVER
149 FLOATING PIN
501, 502, 503, 504, 506, 507 CABLE
B BODY
C CONTROL UNIT
D DOOR
DO VEHICLE DOOR OPENING AND CLOSING APPARATUS
Dt DOOR TRIM
LC CLOSING LATCH MECHANISM
LCA LOWER ARM
LO OPENING LATCH MECHANISM
O DOOR OPENING
OD FULLY OPENING LATCH DEVICE
PSD ELECTRIC OPENING AND CLOSING DEVICE
R RELEASE ELECTRIC MECHANISM
S1, S2 STRIKER
V VEHICLE

What is claimed is:

1. A vehicle door opening and closing apparatus, comprising:
    a closing latch mechanism that is provided in a door and includes:
        a first latch configured to be movable to a latched position from an unlatched position; and
        a first ratchet configured to retain the door in a closed position by engaging with the first latch that is in the latched position;
    an opening latch mechanism that is provided in the door and includes:
        a second latch configured to be movable to a latched position from an unlatched position; and
        a second ratchet configured to hold the door in an open position by engaging with the second latch that is in the latched position;
    a release electric mechanism configured to operate the first ratchet to a released position;
    an opening latch interlocking mechanism configured to operate in a cancel direction from an initial state when the second latch presses against the opening latch interlocking mechanism in association with movement of the second latch from the unlatched position to the latched position and provided, together with the opening latch mechanism, in the door;
    a relay mechanism configured to enable returning of the first ratchet, when the first ratchet is stopped at the released position, by switching over from a connected state to a disconnected state, the connected state connecting a release operation transmission path enabling transmission of release operation of the release electric mechanism to the first ratchet and the disconnected state disconnecting the release operation transmission path, and switch over from the connected state to the disconnected state by the operation of the opening latch interlocking mechanism in the cancel direction; and
    a cable that is routed through an inside of a door trim provided in the door and that transmits the operation of the opening latch interlocking mechanism in the cancel direction to the relay mechanism.

2. The vehicle door opening and closing apparatus according to claim 1, wherein
    the opening latch interlocking mechanism is attached, together with the opening latch mechanism, to a lower surface of a lower arm that supports the door with respect to a door opening of a vehicle, and
    the cable is routed into the door trim from the lower surface of the lower arm.

3. The vehicle door opening and closing apparatus according to claim 2, wherein
    the lower arm includes a plate, and a flange that protrudes downward from a side edge portion of the plate, and
    the opening latch mechanism and the opening latch interlocking mechanism are attached to the lower surface of the plate at a position that is at an inner side of the flange.

4. The vehicle door opening and closing apparatus according to claim 1, wherein
    the opening latch interlocking mechanism includes a cancel lever configured to rotationally move along with rotation of the second latch from the unlatched position to the latched position, and
    the relay mechanism includes a disconnecting lever configured to switch the relay mechanism from the connected state to the disconnected state by being connected to the cancel lever via the cable.

* * * * *